US012764265B2

(12) United States Patent
Iwao

(10) Patent No.: US 12,764,265 B2
(45) Date of Patent: Oct. 13, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomoyori Iwao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 251 days.

(21) Appl. No.: 18/820,355

(22) Filed: Aug. 30, 2024

(65) Prior Publication Data

US 2025/0088617 A1 Mar. 13, 2025

(30) Foreign Application Priority Data

Sep. 7, 2023 (JP) ................................ 2023-145555

(51) Int. Cl.

*H04N 13/117* (2018.01)
*G06T 7/194* (2017.01)
*G06T 17/00* (2006.01)

(52) U.S. Cl.

CPC .......... *H04N 13/117* (2018.05); *G06T 7/194* (2017.01); *G06T 17/00* (2013.01)

(58) Field of Classification Search

None
See application file for complete search history.

(56) References Cited

U.S. PATENT DOCUMENTS 12,272,020 B2 * 4/2025 Wong .................... G06T 3/4038
12,367,638 B1 * 7/2025 Dehkordi ................ G06T 15/00
2019/0022492 A1 * 1/2019 Takahashi ............... G06T 19/00
2023/0281913 A1 * 9/2023 Rematas ................... G06T 7/55 345/419
2024/0257503 A1 * 8/2024 Moon .................. G06V 10/774
2025/0086881 A1 * 3/2025 Iwao ....................... G06T 15/20
2026/0017828 A1 * 1/2026 Takimoto .................. G06T 7/80

OTHER PUBLICATIONS

Mildenhall, B. et al., "NeRF: Representing Scenes as Neural Radiance Fields for View Synthesis" arXiv:2003.08934v.2 (Aug. 2020) pp. 1-25.

* cited by examiner

*Primary Examiner* — Soo Shin
(74) *Attorney, Agent, or Firm* — Carter, DeLuca & Farrell LLP

(57) ABSTRACT

The time required for learning of NeRF is reduced. The image processing apparatus obtains image capturing parameters of each of a plurality of imaging apparatuses arranged at positions different from one another, data of a captured image obtained by image capturing by each of the plurality of imaging apparatuses, and virtual viewpoint information including at least one of information indicating a position of a virtual viewpoint and information indicating a viewing direction from the virtual viewpoint, determines a learning condition of a learning model estimating radiance fields corresponding to an object existing in an image capturing area of the plurality of imaging apparatuses based on the virtual viewpoint information, and performs learning of the learning model based on the learning condition, the image capturing parameters, and data of the captured image.

18 Claims, 14 Drawing Sheets

IMAGE PROCESSING APPARATUS, IMAGE PROCESSING METHOD, AND STORAGE MEDIUM

BACKGROUND

Field

The present disclosure relates to a technique to generate a virtual viewpoint image in an image capturing-target area by an imaging apparatus.

Description of the Related Art

There is a technique to estimate radiance fields of an object (in the following, called "scene") existing in an image capturing-target area by using data of a plurality of captured images (in the following, called "multi-viewpoint images") obtained by image capturing from viewpoints different from one another. Further, there is a technique to generate an image (in the following, called "virtual viewpoint image") corresponding to an appearance of a scene from an arbitrary virtual viewpoint (in the following, called "virtual viewpoint") by using estimated radiance fields. "NeRF: Representing Scenes as Neural Radiance Fields for View Synthesis" (in the following, called "prior art document") has disclosed a technique to generate a virtual viewpoint image by estimating radiance fields by using NeRF (Neural Radiance Fields) configured by a deep learning network. By inputting information indicating an arbitrary position and a viewing direction in a three-dimensional space to learned NeRF obtained as a result of learning of NeRF using multi-viewpoint image data, the color and volume density corresponding to a scene are estimated. Here, the volume density is an index representing the opacity of a color.

In a case where a virtual viewpoint image is generated by using the above-described learned NeRF, in the learned NeRF, processing as follows is performed. First, based on the input position and viewing direction of the virtual viewpoint, an image whose size corresponds to the size of a virtual viewpoint image scheduled to be generated is projected onto the three-dimensional space from the position of the virtual viewpoint and a ray is emitted from the position of the virtual viewpoint toward the direction of each pixel in the image. Following this, a plurality of points in the three-dimensional space, which exists on the ray corresponding to each pixel, is sampled and the color and volume density corresponding to each sampled point are calculated. Further, following this, by accumulating the calculated color and volume density corresponding to each point from the virtual viewpoint for each ray, each pixel value in the virtual viewpoint image is determined and a virtual viewpoint image is generated.

Further, in a case where learning of NeRF is performed, a series of processing as follows is performed repeatedly. First, information indicating the position of the sampling points on a ray in the three-dimensional space and optical axis direction (in the following, called "orientation") of the imaging apparatus is input to the NeRF. The NeRF generates an image corresponding to the captured image obtained by image capturing of the imaging apparatus by performing the same processing as the above-described generation processing of a virtual viewpoint image based on these input pieces of information. Following this, by taking data of the captured image as training data, the weight parameter of the deep learning network configuring the NeRF is updated so that the difference between each pixel value of the image generated by the NeRF and each pixel value of the captured image becomes smaller.

SUMMARY

In order to make it possible to estimate radiance fields of high accuracy by using NeRF, it is necessary to perform learning of NeRF as described above repeatedly by using a large amount of multi-viewpoint image data. Because of this, there is such a problem that learning of NeRF requires much time.

The image processing apparatus according to the present disclosure includes: one or more hardware processors; and one or more memories storing one or more programs configured to be executed by the one or more hardware processors, the one or more programs including instructions for: obtaining image capturing parameters of each of a plurality of imaging apparatuses arranged at positions different from one another; obtaining data of a captured image obtained by image capturing by each of the plurality of imaging apparatuses; obtaining virtual viewpoint information including at least one of information indicating a position of a virtual viewpoint and information indicating a viewing direction from the virtual viewpoint; determining a learning condition of a learning model estimating radiance fields corresponding to an object existing in an image capturing area of the plurality of imaging apparatuses based on the virtual viewpoint information; and performing learning of the learning model based on the learning condition, the image capturing parameters, and data of the captured image.

Further features of various embodiments will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

Embodiment 1

The present embodiment explains a method of reducing the number of pieces of captured image data used for learning of NeRF configured by a deep learning network based on information indicating the position of a virtual viewpoint and the virtual viewing direction (in the following, simply called "viewing direction") at the virtual viewpoint. In the following, the virtual viewpoint is called a virtual camera and the viewing direction of the virtual viewpoint is called an orientation of the virtual camera. Further, information indicating the position and viewing direction of a virtual viewpoint, that is, the position and orientation of a virtual camera is called virtual camera information.

Figure 1:
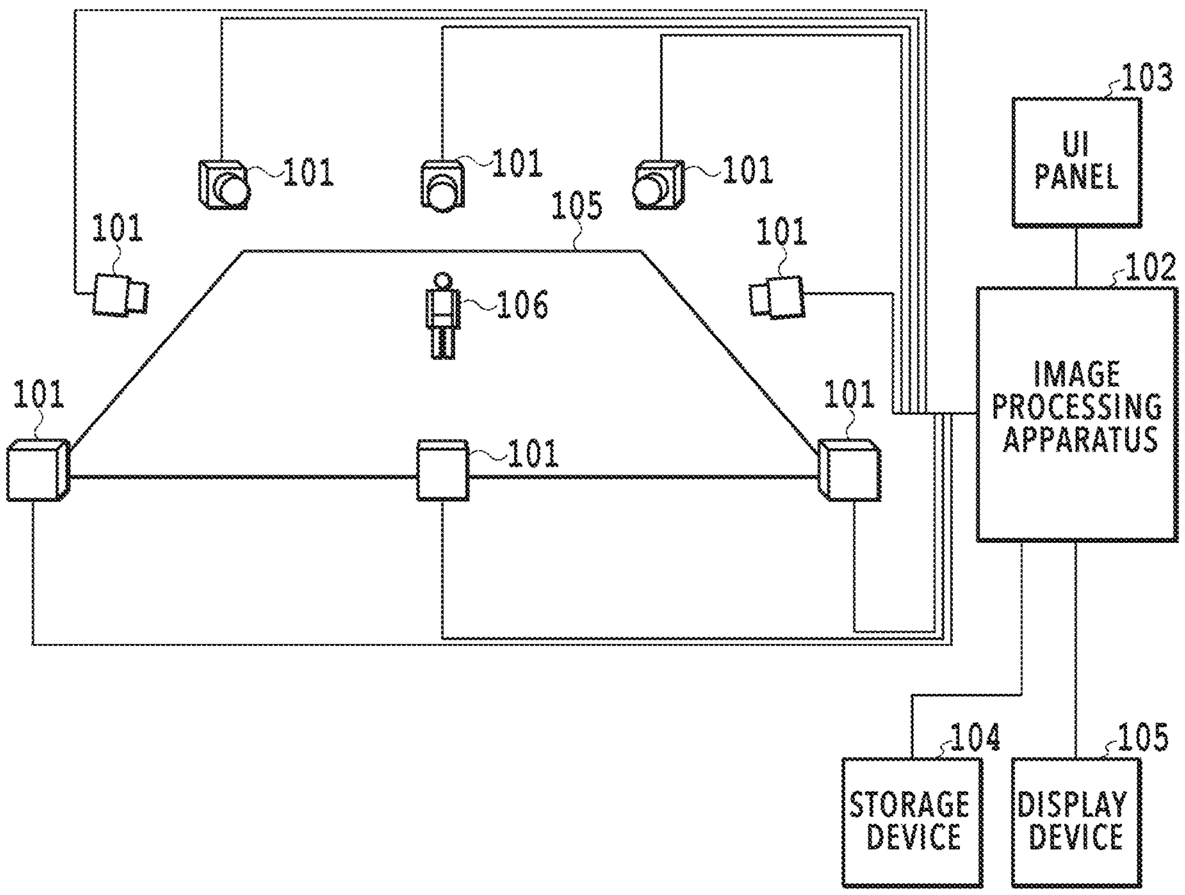
FIG. 1 is a diagram showing one example of a configuration of an image processing system according to Embodiment 1.

FIG. 1 is a diagram showing one example of the configuration of an image processing system according to Embodiment 1. The image processing system has a plurality of imaging apparatuses 101, an image processing apparatus 102, a UI panel 103, a storage device 104, and a display device 105. Each imaging apparatus 101 includes a digital still camera, a digital video camera or the like and captures an object 106 existing in an image capturing-target area in synchronization with one another in accordance with set image capturing conditions. The imaging apparatuses 101 are arranged so as to surround the image capturing-target area. The image processing apparatus 102 performs learning of NeRF by using data of a plurality of captured images (multi-viewpoint images) obtained by synchronous image capturing by each imaging apparatus 101. Further, the image processing apparatus 102 estimates radiance fields of the object 106 corresponding to a given virtual viewpoint by using learned NeRF and generates a virtual viewpoint image corresponding to the appearance from the virtual viewpoint. In the following, the captured image obtained by image capturing by the imaging apparatus 101 is described as "captured image of the imaging apparatus 101".

The UI panel 103 receives an input operation to set image capturing conditions in each imaging apparatus 101 and processing conditions in each imaging apparatus 101 and the image processing apparatus 102. Further, it is possible for the UI panel 103 to receive an input operation to set the position and viewing direction of a virtual viewpoint, that is, the position and orientation of a virtual camera in a case where a virtual viewpoint image is generated based on radiance fields estimated by NeRF. It is not necessarily required to perform the above-described input operation via the UI panel and the input operation may also be performed via another operation input device connected to the image processing apparatus 102, for example, such as a mouse or a keyboard. The storage device 104 stores multi-viewpoint image data obtained by the image processing apparatus 102, information on the radiance fields of the object 106, which are estimated by the image processing apparatus 102, and the like. The display device 105 displays a virtual viewpoint image generated by the image processing apparatus 102. The configuration of the image processing system is not limited to that described above and a variety of configuration elements may exist other than the above-described configuration. However, the configuration other than the above-described configuration is not the main purpose of the present disclosure, and therefore, explanation thereof is omitted.

Figure 2:
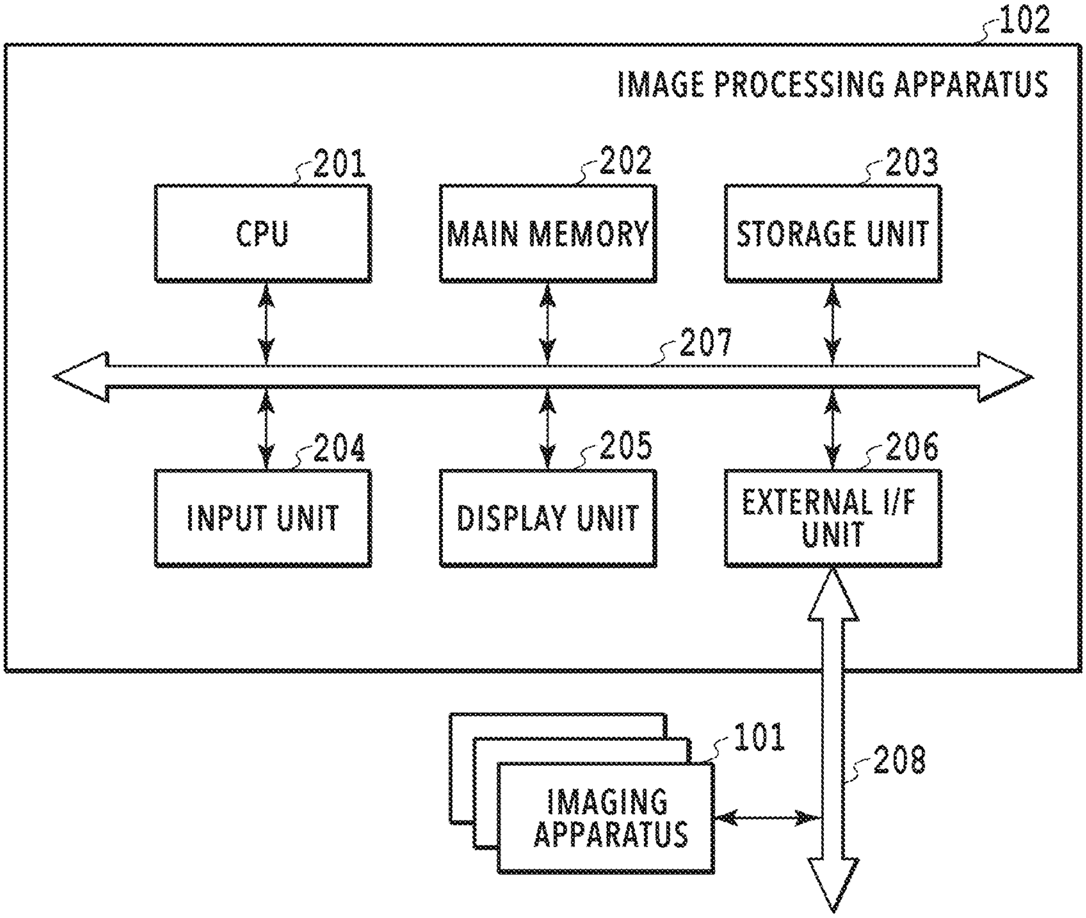
FIG. 2 is a block diagram showing one example of a hardware configuration of an image processing apparatus according to Embodiment 1.

FIG. 2 is a block diagram showing one example of the hardware configuration of the image processing apparatus 102 according to Embodiment 1. The image processing apparatus 102 has a CPU 201, a main memory 202, a storage unit 203, an input unit 204, a display unit 205, and an external I/F unit 206 and these units are connected to one another so as to be capable of communication via a bus 207. The CPU 201 is an arithmetic processing device that comprehensively controls the image processing apparatus 102 and performs various pieces of processing by executing various programs stored in the storage unit 203 and the like. The main memory 202 temporarily stores various pieces of data, parameters and the like, which are used by the CPU 201 in a case of performing various pieces of processing. Further, the main memory 202 provides a work area to the CPU 201.

The storage unit 203 is a large-capacity storage device storing various programs, various pieces of data necessary for display of a GUI (Graphical User Interface) on the display device 105, and the like and includes a nonvolatile memory, such as a hard disk or a silicon disk. The input unit 204 is an operation input device, such as a keyboard, a mouse, an electronic pen, or a touch panel, and receives input operations from a user. The display unit 205 includes a liquid crystal panel or the like and displays the GUI and the like output from the image processing apparatus 102. The CPU 201 also operates as a display control unit configured to control the display unit 205 and an input control unit configured to control the input unit 204. In Embodiment 1, explanation is given on the assumption that the display unit 205 and the input unit 204 exist inside the image processing apparatus 102, but it may also be possible for at least one of the display unit 205 and the input unit 204 to exist outside the image processing apparatus 102 as another device. The external I/F unit 206 is connected to each imaging apparatus 101 via a LAN 208 and performs transmission and reception of captured image data and control signals.

Each imaging apparatus 101 is connected with the image processing apparatus 102 via the LAN 208. Each imaging apparatus 101 receives a control signal output from the image processing apparatus 102 and based on the received control signal, starts and stops image capturing, changes the setting of image capturing conditions, such as shutter speed and aperture value, and performs transmission of captured image data obtained by image capturing.

Figure 3C:
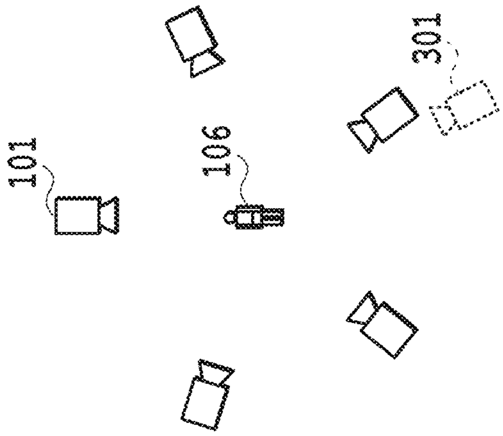
FIG. 3A to FIG. 3C are each a diagram for explaining captured image data used for learning of NeRF according to Embodiment 1.
Figure 3B:
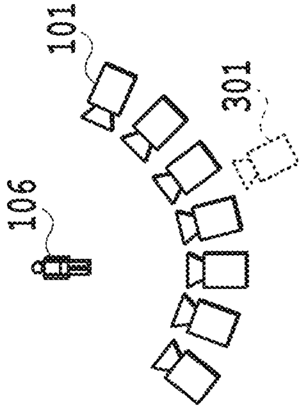
Figure 3A:
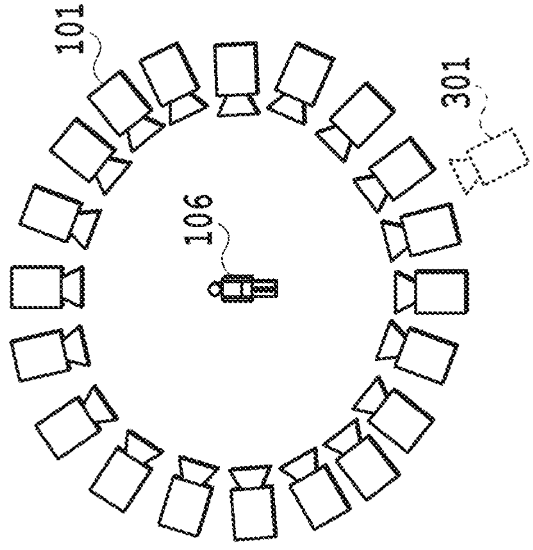

FIG. 3A is a diagram for explaining a camera arrangement used for learning of NeRF according to Embodiment 1. FIG. 3A is a diagram for explaining one example of captured image data used for the conventional learning of NeRF. In the conventional learning of NeRF, the data of captured images (multi-viewpoint images) of all the imaging apparatuses 101 capable of capturing the object 106 is used for learning of NeRF irrespective of the position and orientation of a virtual camera 301.

FIG. 3B is a diagram for explaining one example of a camera arrangement used for learning of NeRF according to the present embodiment. As described above, in the conventional learning of NeRF, the multi-viewpoint image data obtained by image capturing by all the imaging apparatuses 101 is used for learning of NeRF irrespective of the position and orientation of the virtual camera 301. In contrast to this, in the learning of NeRF according to the present embodiment, as shown in FIG. 3B, only the captured image data of the one or more imaging apparatuses 101 whose position or orientation is close to that of the virtual camera 301 is used for the learning of NeRF. That is, the captured image data of the imaging apparatus 101 other than the imaging apparatus 101 whose position or orientation is close to that of the virtual camera 301 is not used for learning of NeRF and thereby the number of pieces of captured image data used for learning is reduced. By reducing the number of pieces of captured image data used for learning, it is possible to reduce the time required for learning of NeRF.

FIG. 3C is a diagram showing a conventional general example in a case where the number of pieces of captured image data used for learning of NeRF is reduced. As shown as one example in FIG. 3C, by uniformly reducing the number of imaging apparatuses 101 surrounding the object 106, it is possible to reduce the number of pieces of captured image data used for learning of NeRF. With the reduction method such as this, however, the accuracy of radiance fields estimated by the learned NeRF is reduced. As a result, with the reduction method such as this, the image quality of a virtual viewpoint image that is generated is reduced.

On the other hand, the image processing apparatus 102 according to the present embodiment performs learning of NeRF by concentratedly using the captured image data of the imaging apparatus 101 whose position or orientation is close to that of the virtual camera 301 with the reduction method as shown in FIG. 3B. According to the learned NeRF obtained as a result of the learning such as this, it is possible to suppress the reduction in image quality of the radiance fields estimated and the virtual viewpoint image generated at the position and orientation of the virtual camera at least the same or substantially the same as the position and orientation of the virtual camera 301. That is, by performing learning of NeRF concentratedly by using the captured image data of the imaging apparatus 101 whose position or orientation is close to that of the virtual camera 301, it is possible to maintain the estimation accuracy of radiance fields at high accuracy while reducing the time required for learning of NeRF.

Figure 4:
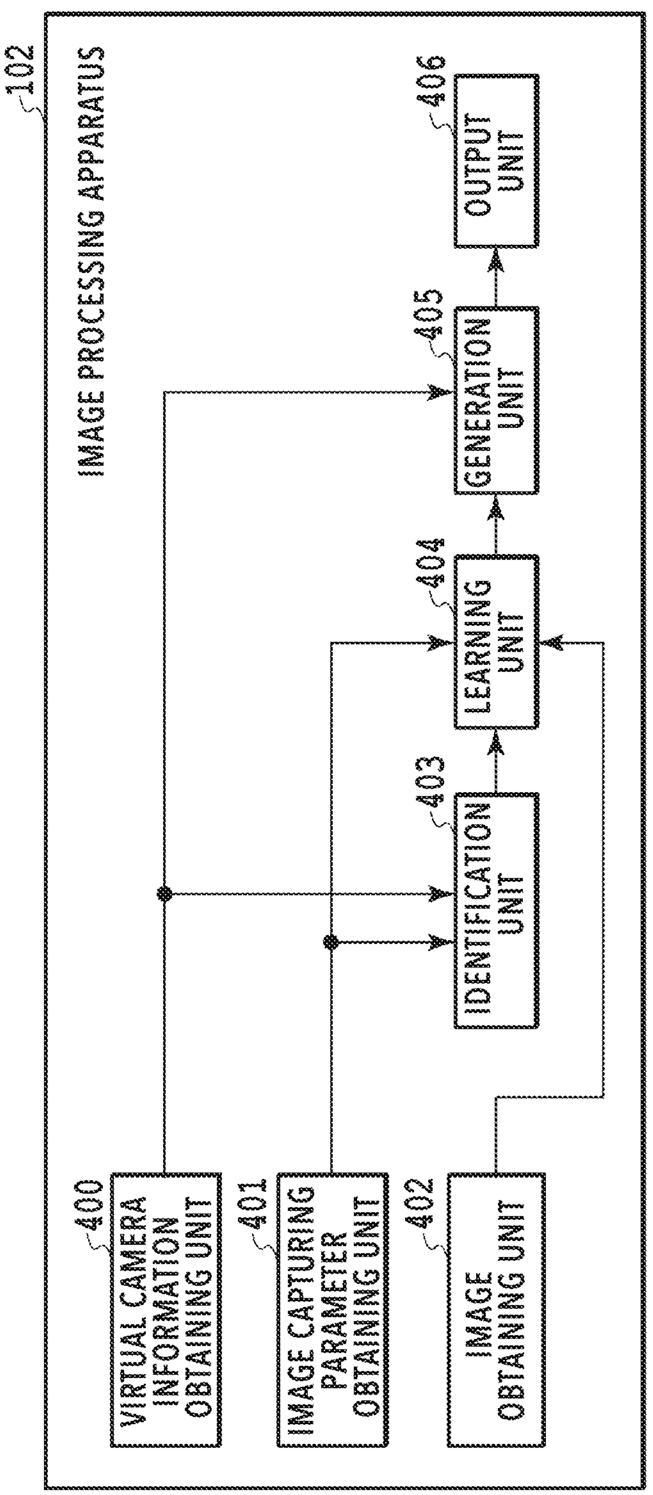
FIG. 4 is a block diagram showing one example of a function configuration of the image processing apparatus according to Embodiment 1.

FIG. 4 is a block diagram showing one example of the function configuration of the image processing apparatus 102 according to Embodiment 1. The image processing apparatus 102 has a virtual camera information obtaining unit 400, an image capturing parameter obtaining unit 401, an image obtaining unit 402, an identification unit 403, a learning unit 404, a generation unit 405, and an output unit 406. The virtual camera information obtaining unit 400 obtains virtual camera information. The virtual camera information obtaining unit 400 obtains virtual camera information set by a user via a mouse, keyboard or the like, which is the input unit 204 of the image processing apparatus 102, or via the UI panel 103. The virtual camera information obtained by the virtual camera information obtaining unit 400 is transmitted to the identification unit 403 and the generation unit 405. The image obtaining unit 402 obtains captured image data of each imaging apparatus 101, that is, multi-viewpoint image data. Specifically, for example, the image obtaining unit 402 obtains multi-viewpoint image data obtained by synchronous image capturing of all the imaging apparatuses 101. The multi-viewpoint image data obtained by the image obtaining unit 402 is transmitted to the learning unit 404. By using part of a plurality of pieces of captured image data configuring the multi-viewpoint image data as learning image data, learning of NeRF is performed.

The image capturing parameter obtaining unit 401 obtains image capturing parameters including extrinsic parameters, intrinsic parameters, distortion parameters and the like of each imaging apparatus 101. For example, the image capturing parameters are generated based on the results of camera calibration performed in advance by an external device different from the image processing apparatus 102 and the image capturing parameter obtaining unit 401 obtains the image capturing parameters generated by the external device. The obtaining method of image capturing parameters is not limited to the above-described method and for example, it may also be possible for the image capturing parameter obtaining unit 401 to generate and obtain image capturing parameters by performing camera calibration using multi-viewpoint image data obtained by the image obtaining unit 402. The image capturing parameters obtained by the image capturing parameter obtaining unit 401 are transmitted to the identification unit 403 and the learning unit 404.

The identification unit 403 receives the virtual camera information transmitted from the virtual camera information obtaining unit 400 and the image capturing parameters of each imaging apparatus, which are transmitted from the image capturing parameter obtaining unit 401. The identification unit 403 identifies the imaging apparatus 101 that outputs the captured image data used as learning image data for learning of NeRF from among all the imaging apparatuses 101 based on the virtual camera information and the image capturing parameters of each imaging apparatus. That is, the identification unit 403 determines the captured image data used as learning image data for learning of NeRF from among the multi-viewpoint image data obtained by the image obtaining unit 402 by identifying the imaging apparatus 101. Details of the identification method of the imaging apparatus 101 will be described later. Information indicating the imaging apparatus 101 identified by the identification unit 403 is transmitted to the learning unit 404.

The learning unit 404 performs learning of NeRF based on the image capturing parameters of the imaging apparatus 101 identified by the identification unit 403 and the captured image data. Specifically, first, the learning unit 404 inputs the image capturing parameters of the imaging apparatus 101 to NeRF, which is an arbitrary one among the one or more imaging apparatuses 101 identified by the identification unit 403. More specifically, the learning unit 404 inputs at least information indicating the position and orientation of the imaging apparatus 101 to NeRF, which are extrinsic parameters of the image capturing parameters. In the NeRF, based on the input information indicating the position and orientation of the imaging apparatus 101, radiance fields of the object 106 are estimated. Further, in the NeRF, by using the estimation results of the radiance fields, an image is generated by the same processing as the generation of a virtual viewpoint image. The learning unit 404 obtains data of the image generated by the NeRF. Following this, the learning unit 404 updates the weight parameter of the NeRF so that the difference between the image generated by the NeRF and the captured image becomes smaller by using the captured image data of the imaging apparatus 101 as ground truth learning image data (training image data). The learning unit 404 performs learning of NeRF by repeatedly performing the above-described series of processing. The learned NeRF obtained as a result of learning by the learning unit 404 is transmitted to the generation unit 405.

The generation unit 405 receives the learned NeRF that is transmitted from the learning unit 404 and the virtual camera information that is transmitted from the virtual camera information obtaining unit 400 and generates a virtual viewpoint image based on the received learned NeRF and virtual camera information. Specifically, the generation unit 405 inputs the virtual camera information, that is, information indicating the position and orientation of the virtual camera to the learned NeRF. In the learned NeRF, based on the input information indicating the position and orientation of the virtual camera, radiance fields of the object 106 are estimated. Further, in the learned NeRF, a virtual viewpoint image is generated by using the estimation results of the radiance fields. The generation unit 405 obtains data of the virtual viewpoint image generated by the learned NeRF. The data of the virtual viewpoint image generated by the generation unit 405 is transmitted to the output unit 406. The output unit 406 receives the data of the virtual viewpoint image and outputs the data. Specifically, for example, the output unit 406 generates a GUI including a preview image of the virtual viewpoint image and outputs and displays the generated GUI on the display unit 205.

Figure 5:
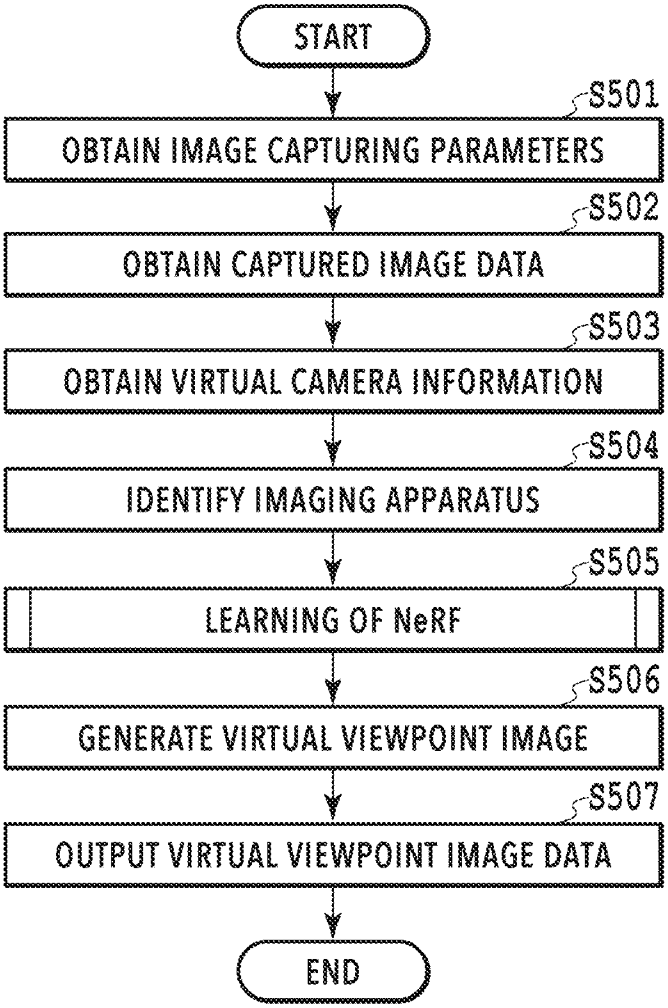
FIG. 5 is a flowchart showing one example of a series of processing flows of the image processing apparatus according to Embodiment 1.
Figure 6:
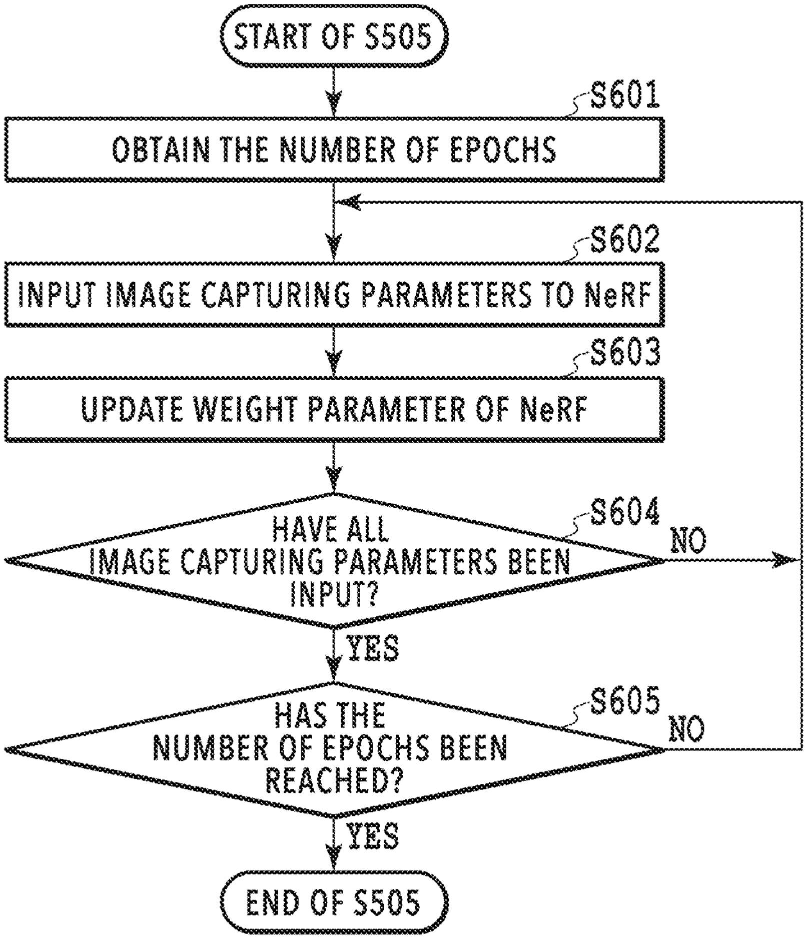
FIG. 6 is a flowchart showing one example of a flow of learning processing in a learning unit according to Embodiment 1.

With reference to FIG. 5 and FIG. 6, the operation of the image processing apparatus 102 is explained. FIG. 5 is a flowchart showing one example of the series of processing flows of the image processing apparatus 102 according to Embodiment 1. In the following explanation, "S" indicated at the top of the symbol represents a step (process). Further, the processing at each step shown in the flowchart in FIG. 5 is implemented by the CPU 201 reading a predetermined program from the storage unit 203 and loading the program onto the main memory 202, and then executing the program.

First, at S501, the image capturing parameter obtaining unit 401 obtains the image capturing parameters of each imaging apparatus 101. Next, at S502, the image obtaining unit 402 obtains the multi-viewpoint image data obtained by image capturing by each imaging apparatus 101. Specifically, for example, the image obtaining unit 402 transmits a signal instructing each imaging apparatus 101 to perform image capturing via the LAN 208. Each imaging apparatus 101 receives the signal, performs image capturing in synchronization with one another, and transmits captured image data obtained by the image capturing to the image processing apparatus 102 via the LAN 208. The image obtaining unit 402 receives the captured image data transmitted from each imaging apparatus 101 via the LAN 208, the external I/F unit 206, and the bus 207. Each piece of captured image data received by the image obtaining unit 402, that is, the multi-viewpoint image data is stored in the main memory 202.

Next, at S503, the virtual camera information obtaining unit 400 obtains virtual camera information. Next, at S504, the identification unit 403 identifies the imaging apparatus 101 that outputs the captured image data used as learning image data for learning of NeRF from among all the imaging apparatuses 101 based on the virtual camera information obtained at S503. Specifically, for example, the identification unit 403 identifies the imaging apparatus 101 that outputs the captured image data used as learning image data for learning of NeRF by using the orientation of the virtual camera, that is, information indicating the viewing direction at the virtual viewpoint.

As described above, in the conventional learning method of NeRF, the learning of NeRF is performed by using all the captured image data configuring the multi-viewpoint image data as learning image data. By the learning such as this, it is possible for the conventional learned NeRF to estimate the color and volume density corresponding to the virtual viewpoint designated at an arbitrary position in the three-dimensional space and an arbitrary viewing direction designated at the virtual viewpoint. On the other hand, in the learning method of NeRF according to the present embodiment, the learning of NeRF is performed by using only the captured image data of the imaging apparatus 101 whose orientation is close to that of the virtual camera as learning image data. According to the learned NeRF obtained as a result of the learning such as this, it is possible to estimate the color and volume density in a case where the object 106 is viewed from the orientation of the virtual camera, that is, the direction close to the viewing direction at the virtual viewpoint. In this case, the captured image data obtained by image capturing by the imaging apparatus 101 whose orientation is close to that of the virtual camera is used as learning image data, and therefore, the virtual viewpoint image that is generated is an image whose deterioration of image quality is very slight. On the other hand, the accuracy of the virtual viewpoint image that is generated in a case where the orientation of the virtual camera is changed considerably will be reduced largely.

For example, first, the identification unit 403 sets a threshold value $\theta_{th}$ [deg] of the angle formed by a direction vector indicating the orientation of the virtual camera and a direction vector indicating the orientation of each imaging apparatus 101. Next, the identification unit 403 identifies the imaging apparatus 101 whose direction vector satisfies formula (1) below from among all the imaging apparatuses 101 as the imaging apparatus 101 that outputs the captured image data used as learning image data for learning of NeRF.

$$\left|\arccos\left((v_m \cdot v_r)/(|v_m|\,|v_r|)\right)\right| < \theta_{th} \qquad \text{formula (1)}$$

Here, $v_m$ represents the direction vector indicating the orientation of the virtual camera, $v_r$ represents the direction vector indicating the orientation of the imaging apparatus 101, and $v_m \cdot v_r$ represents the inner product value of $v_m$ and $v_r$. It is assumed that arccos (x) takes a value between −180 and 180 [deg]. The identification unit 403 identifies each of the one or more imaging apparatuses 101 that satisfy formula (1) as the imaging apparatus 101 that outputs the captured image data used as learning image data for learning of NeRF.

In the present embodiment, explanation is given on the assumption that the imaging apparatus 101 is identified by using the one threshold value $\theta_{th}$ given in advance, but the number of threshold values used by the identification unit 403 is not limited to one and it may also be possible for the identification unit 403 to identify the imaging apparatus 101 by using a plurality of threshold values. Further, it may also be possible for the identification unit 403 to identify the imaging apparatus 101 based on the position of the virtual camera and the position of the imaging apparatus 101 in place of the orientation of the virtual camera and the orientation of the imaging apparatus 101. For example, in this case, the identification unit 403 first sets a threshold value $d_{th}$ of the distance between the position of the virtual camera and the position of the imaging apparatus 101. Next, the identification unit 403 identifies the imaging apparatus 101 whose distance between the position of the virtual camera and the position of the imaging apparatus 101 satisfies, for example, formula (2) below as the imaging apparatus 101 that outputs the captured image data used as learning image data for learning of NeRF.

$$\| p_m - p_r \|_2 < d_{th} \qquad \text{formula (2)}$$

Here, $p_m$ is a position vector representing the position of the virtual camera in the three-dimensional space, $p_r$ is a position vector representing the position in the three-dimensional space, which corresponds to the position of the imaging apparatus 101, and $\|x\|_2$ represents the Euclid norm of a vector x. Further, for example, it may also be possible for the identification unit 403 to identify the imaging apparatus 101 that satisfies both formula (1) and formula (2) as the imaging apparatus 101 that outputs the captured image data used as learning image data for learning of NeRF by using formula (1) and formula (2).

After S504, at S505, the learning unit 404 performs learning of NeRF by using only the captured image data of the imaging apparatus 101 identified at S504 among the multi-viewpoint image data obtained at S502 as learning image data. Details of the processing of the learning unit 404 at S505 will be described later by using FIG. 6. Next, at S506, the generation unit 405 generates a virtual viewpoint image based on the learned NeRF obtained as a result of the learning at S505 and the virtual camera information obtained at S503. Specifically, the generation unit 405 inputs the virtual camera information to the learned NeRF and obtains data of the virtual viewpoint image generated and output by the learned NeRF. As the generation method of a virtual viewpoint image in the learned NeRF, it is possible to use a volume rendering method, to be described later. After S506, at S507, the output unit 406 outputs the virtual viewpoint image generated at S506. After S507, the image processing apparatus 102 terminates the processing of the flowchart shown in FIG. 5.

FIG. 6 is a flowchart showing one example of a flow of learning processing in the learning unit 404 according to Embodiment 1 and is a flowchart showing one example of a detailed flow of the processing at S505 shown in FIG. 5. This processing of the flowchart is performed after the processing at S504 shown in FIG. 5. First, at S601, the learning unit 404 obtains the number of epochs of learning in a case where learning of NeRF is performed. The number of epochs is a numerical value representing the number of time of learning in deep learning. In the present embodiment, it is assumed that the number of epochs is an index indicating how many times the learning using each piece of captured image data is performed for each piece of captured image data in a case where the learning image data is data of nu captured images.

Next, at S602, the learning unit 404 selects the one imaging apparatus 101, which is an arbitrary one, from among the one or more imaging apparatuses 101 identified at S504 and inputs the image capturing parameters of the selected imaging apparatus 101 to the NeRF. In the image capturing parameters input to the NeRF, at least information indicating the position and orientation of the imaging apparatus 101 is included.

The NeRF disclosed in the prior art document includes a multilayer perceptron (in the following, described as "MLP") deep learning network. The NeRF according to the present embodiment may include an MLP deep learning network, or may include a deep learning network other than the MLP deep learning network. In a case where the NeRF according to the present embodiment is one including the MLP deep learning network, in the learning phase of NeRF, as in the method disclosed in the prior art document, processing as follows is simply performed in the NeRF.

First, by the learning unit 404, information indicating the position and orientation of the imaging apparatus 101 is input to the NeRF. In this case, it is preferable for the learning unit 404 to perform transform processing to increase the number of dimensions of the information that is input and input the information for which the transform processing has been performed to the NeRF so that it is also possible to grasp the change in the high-frequency component of the radiance fields. Next, the NeRF projects an image whose size is that of the image scheduled to be generated onto the three-dimensional space from the position in the three-dimensional space, which corresponds to the input position of the imaging apparatus 101, and emits a virtual ray from the position toward the direction of each pixel in the projected image. Next, the NeRF performs sampling of a plurality of points existing on the emitted ray in the three-dimensional space and calculates the color and volume density of each sampled point. Next, the NeRF generates an image by accumulating the calculated colors and volume densities of the plurality of points for each emitted ray from the position in the three-dimensional space, which corresponds to the position of the imaging apparatus 101. The generation method of an image such as this is generally called the volume rendering method. Finally, the NeRF outputs data of the generated image.

After S602, at S603, the learning unit 404 updates the weight parameter of the NeRF by using the captured image data of the imaging apparatus 101, which corresponds to the image capturing parameters input to the NeRF at S602, as ground truth learning image data (training image data). Specifically, the learning unit 404 updates the weight parameter of the NeRF so that the difference between the data of the image generated and output by the NeRF and the learning image data becomes small. Next, at S604, the learning unit 404 judges whether or not the image capturing parameters of all the imaging apparatuses 101 identified at S504 have been input at S602. In a case where it is judged that the image capturing parameters of at least part of the imaging apparatuses 101 have not been input at S604, the learning unit 404 returns to the processing at S602. In this case, at S602, the learning unit 404 inputs the image capturing parameters of the imaging apparatus 101 whose image capturing parameters have not been input yet among all the imaging apparatuses 101 identified at S504 to the NeRF. After that, the learning unit 404 performs the processing at S602 to S604 repeatedly until it is judged that the image capturing parameters of all the imaging apparatuses 101 have been input at S604.

In a case where it is judged that the image capturing parameters of all the imaging apparatuses 101 have been input at S604, the learning unit 404 judges, at S605, whether or not the number of times of learning of NeRF has reached the number of epochs obtained at S601. Specifically, the learning unit 404 judges whether or not the number of times of learning of NeRF has reached the number of epochs for each piece of captured image data of each imaging apparatus 101 identified at S504. In a case where it is judged that the number of epochs has not been reached at S605, the learning unit 404 returns to the processing at S602 and performs the processing at S602 to S605 repeatedly until it is judged that the number of epochs has been reached at S605. In this case, the learning unit 404 performs the processing at S602 to S604 repeatedly until it is judged that the image capturing parameters of all the imaging apparatuses 101 have been input at S604 for each time of learning. In a case where it is judged that the number of epochs has been reached at S605, the learning unit 404 terminates the processing of the flowchart shown in FIG. 6, that is, the processing at S505.

In the present embodiment, explanation is given on the assumption that the termination condition of learning processing of NeRF in the learning unit 404 is that the number of times of learning reaches the number of epochs, but the termination condition of learning processing is not limited to this. For example, it may also be possible for the learning unit 404 to terminate learning in a case where the amount of updating of the weight parameter of NeRF falls within a predetermined range or in a case where the amount of change in the image that is generated by NeRF becomes smaller than a predetermined reference.

As above, in the present embodiment, the image processing apparatus 102 is configured so that the imaging apparatus 101 whose orientation or position is close to that of the virtual camera is identified in a case of learning of NeRF and only the captured image data of the identified imaging apparatus 101 is used as learning image data. According to the image processing apparatus 102 thus configured, by reducing the number of learning images used for learning of NeRF, it is possible to estimate the radiance fields of the object 106 with high accuracy and generate a virtual viewpoint image whose deterioration of image quality is slight while reducing the learning time of NeRF.

Embodiment 2

The image processing apparatus 102 according to Embodiment 1 performs learning of NeRF by using only the captured image data of the imaging apparatus 101 whose orientation or position is close to that of the virtual camera as learning image data of NeRF. With the learning method of NeRF explained in Embodiment 1, in a case where the number of imaging apparatuses 101 whose orientation or position is close to that of the virtual camera is sufficiently large, it is possible to estimate the radiance fields of high accuracy. In a case where, however, the number of imaging apparatuses 101 whose orientation or position is close to that of the virtual camera is small, there is a possibility that it is not possible to estimate the radiance fields of high accuracy. Consequently, in Embodiment 2, an aspect is explained in which the learning time of NeRF is reduced by using the captured image data of all the imaging apparatuses 101 as learning image data in place of using only the captured image data of the imaging apparatus 101 identified by the identification unit 403 as learning image data. The function configuration of the image processing apparatus 102 according to Embodiment 2 (in the following, simply described as “image processing apparatus 102”) is the same as that of the image processing apparatus 102 according to Embodiment 1 shown as one example in FIG. 2 and FIG. 4. In Embodiment 2, contents different from those of Embodiment 1 are explained mainly.

The learning unit 404 according to Embodiment 2 (in the following, simply described as “learning unit 404”) performs learning or NeRF a predetermined number of times by using the captured image data of all the imaging apparatuses 101 as learning image data before performing the learning processing explained in Embodiment 1. By using the captured image data of all the imaging apparatuses 101 as learning image data, it is possible to estimate the radiance fields of accuracy higher than that in a case where only the captured image data of the imaging apparatus 101 whose orientation or position is close to that of the virtual camera is used as learning image data. Specifically, the learning unit 404 performs learning processing using the captured image data of all the imaging apparatuses 101 as learning image data and learning processing using only the captured image data of the imaging apparatus 101 whose orientation or position is close to that of the virtual camera as learning image data. That is, the learning unit 404 further performs learning using only the captured image data of the imaging apparatus 101 whose orientation or position is close to that of the virtual camera as learning image data for the NeRF for which learning has been performed by using the captured image data of all the imaging apparatuses 101 as learning image data.

More specifically, for example, in the conventional learning of NeRF, learning is performed n times by using the captured image data of all the imaging apparatuses 101 as learning image data. In contrast to this, in learning of NeRF in the present embodiment, first, learning is performed $n_D$ times by using the captured image data of all the imaging apparatuses 101 as learning image data. After that, learning is performed $n_T$ times ($(n-n_D)$ times) by using only the captured image data of the imaging apparatus 101 whose orientation or position is close to that of the virtual camera. According to the learning method such as this, with the learning performed $n_T$ times, which uses only the captured image data of the imaging apparatus 101 whose orientation or position is close to that of the virtual camera as learning image data, it is possible to reduce the learning image data by an amount corresponding to the difference from the captured image data of all the imaging apparatuses 101. As a result, according to the image processing apparatus 102 according to the present embodiment, compared to the conventional case where learning is performed n times by using the captured image data of all the imaging apparatuses 101 as learning image data, it is possible to reduce the learning time of NeRF.

Figure 7:
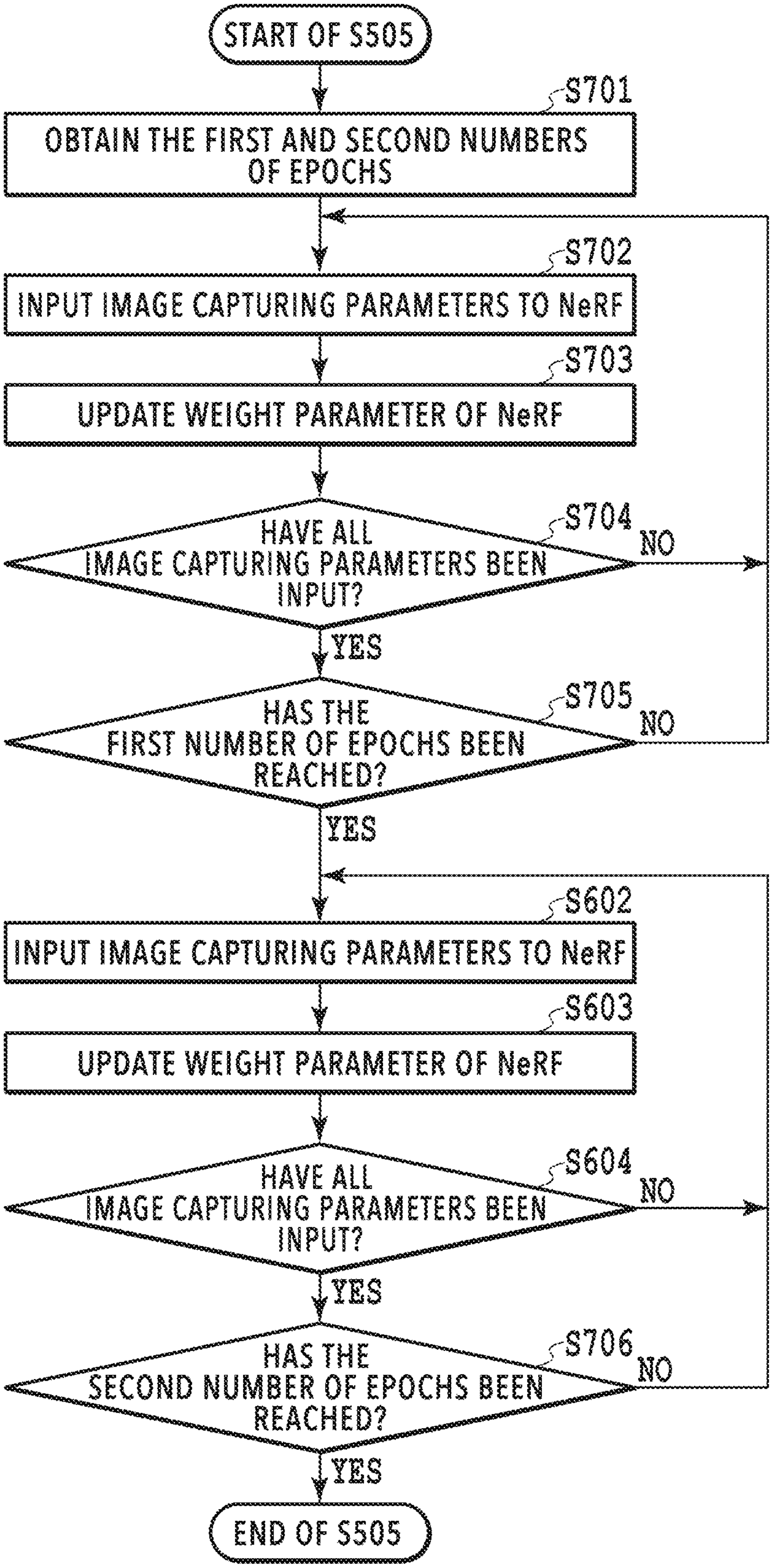
FIG. 7 is a flowchart showing one example of a flow of learning processing in a learning unit according to Embodiment 2.

With reference to FIG. 7, the operation of the image processing apparatus 102 is explained. The image processing apparatus 102 sequentially performs the processing at S501 to S507 shown in the flowchart in FIG. 5 like the image processing apparatus 102 according to Embodiment 1, but the processing of the learning unit 404 at S505 is different from the processing of the learning unit 404 according to Embodiment 1. With reference to FIG. 7, the difference in the processing between the learning unit 404 and the learning unit 404 according to Embodiment 1 is explained. FIG. 7 is a flowchart showing one example of a flow of the learning processing in the learning unit 404 according to Embodiment 2 and is a flowchart showing one example of a detailed flow of the processing at S505 shown in FIG. 5. This processing of the flowchart is performed after the processing at S504 shown in FIG. 5. In the explanation of the flowchart shown in FIG. 7, explanation of the step at which the same processing as that at the step shown in the flowchart in FIG. 6 is performed is omitted by attaching the same symbol to the step.

First, at S701, the learning unit 404 obtains the number of epochs of learning in a case where learning of NeRF is performed. As explained in Embodiment 1, the number of epochs is a numerical value representing the number of times of learning in deep learning. The learning of NeRF according to the present embodiment is divided into a step of learning using the captured image data of all the imaging apparatuses 101 as learning image data and a step of learning using only the captured image data of the imaging apparatus 101 whose orientation or position is close to that of the virtual camera as learning image data. Because of this, the learning unit 404 obtains a first number of epochs of learning using the captured image data of all the imaging apparatuses 101 as learning image data and a second number of epochs of learning using only the captured image data of the imaging apparatus 101 whose orientation or position is close to that of the virtual camera as learning image data.

Next, at S702, the learning unit 404 selects the imaging apparatus 101, which is an arbitrary one, from among all the imaging apparatuses 101 and inputs the image capturing parameters of the selected imaging apparatus 101 to the NeRF. Next, at S703, the learning unit 404 updates the weight parameter of NeRF by taking the captured image data of the imaging apparatus 101, which corresponds to the image capturing parameters input to the NeRF at S702, as ground truth learning image data (training image data). Specifically, the learning unit 404 updates the weight parameter of NeRF so that the difference between the data of the image generated and output by the NeRF and the learning image data becomes small. Next, at S704, the learning unit 404 judges whether or not the image capturing parameters of all the imaging apparatuses 101 have been input at S702.

In a case where it is judged that the image capturing parameters of at least part of the imaging apparatuses 101 have not been input at S704, the learning unit 404 returns to the processing at S702. In this case, at S702, the learning unit 404 inputs the image capturing parameters of the imaging apparatus 101 among all the imaging apparatuses 101, whose image capturing parameters have not been input yet, to the NeRF. After that, the learning unit 404 performs the processing at S702 to S704 repeatedly until it is judged that the image capturing parameters of all the imaging apparatuses 101 have been input at S704. In a case where it is judged that the image capturing parameters of all the imaging apparatuses 101 have been input at S704, the learning unit 404 judges, at S705, whether or not the number of times of learning of NeRF has reached the first number of epochs obtained at S701. Specifically, the learning unit 404 judges whether or not the number of times of learning of NeRF has reached the first number of epochs for each piece of captured image data of each of all the imaging apparatuses 101.

In a case where it is judged that the first number of epochs has not been reached at S705, the learning unit 404 returns to the processing at S702 and performs the processing at S702 to S705 repeatedly until it is judged that the first number of epochs has been reached at S705. In this case, the learning unit 404 performs the processing at S702 to S704 repeatedly until it is judged that the image capturing parameters of all the imaging apparatuses 101 have been input at S704 for each time of learning.

In a case where it is judged that the first number of epochs has been reached at S705, the learning unit 404 performs the processing at S602 to S604. Specifically, the learning unit 404 performs the processing at S602 to S604 repeatedly until it is judged that the image capturing parameters of all the imaging apparatuses 101 have been input at S604. In a case where it is judged that the image capturing parameters of all the imaging apparatuses 101 have been input at S604, the learning unit 404 judges, at S706, whether or not the number of times of learning of NeRF has reached the second number of epochs obtained at S701. Specifically, the learning unit 404 judges whether or not the number of times of learning of NeRF has reached the second number of epochs for each piece of captured image data of each imaging apparatus 101 identified at S504.

In a case where it is judged that the second number of epochs has not been reached at S706, the learning unit 404 returns to the processing at S602 and performs the processing at S602 to S706 repeatedly until it is judged that the number of epochs has been reached at S706. In this case, the learning unit 404 performs the processing at S602 to S604 repeatedly until it is judged that the image capturing parameters of all the imaging apparatuses 101 have been input at S604 for each time of learning. In a case where it is judged that the second number of epochs has been reached at S706, the learning unit 404 terminates the processing of the flowchart shown in FIG. 7, that is, the processing at S505.

In the present embodiment, explanation is given on the assumption that after learning is performed by using the captured image data of all the imaging apparatuses 101 as learning image data, learning is performed by using only the captured image data of the imaging apparatus 101 whose orientation or position is close to that of the virtual camera as learning image data. The above-described order of learning is, however, only one example and the order of learning of NeRF is not limited to the above-described order. For example, it may also be possible for the image processing apparatus 102 to perform learning by using the captured image data of all the imaging apparatuses 101 as learning image data after performing learning by using only the captured image data of the imaging apparatus 101 whose orientation or position is close to that of the virtual camera as learning image data.

Further, for example, it may also be possible for the image processing apparatus 102 to perform learning of NeRF as follows. First, the image processing apparatus 102 performs learning by using only the captured image data of the imaging apparatus 101 whose orientation or position is close to that of the virtual camera as learning image data after performing learning by using the captured image data of all the imaging apparatuses 101 as learning image data. Following this, the image processing apparatus 102 performs learning again by using the captured image data of all the imaging apparatuses 101 as learning image data. That is, it may also be possible for the image processing apparatus 102 to perform the learning using the captured image data of all the imaging apparatuses 101 as learning image data and the learning using only the captured image data of the imaging apparatus 101 whose orientation or position is close to that of the virtual camera as learning image data by dividing the learning into a plurality times.

Further, in the present embodiment, explanation is given on the assumption that the learning using only the captured image data of the imaging apparatus 101 whose orientation or position is close to that of the virtual camera as learning image data is performed as one piece of learning processing. It may also be possible, however, for the image processing apparatus 102 to perform the learning using only the captured image data of the imaging apparatus 101 whose orientation or position is close to that of the virtual camera as learning image data by dividing the learning into a plurality of pieces of learning processing.

For example, the image processing apparatus 102 performs the learning using only the captured image data of the imaging apparatus 101 whose orientation or position is close to that of the virtual camera as learning image data by dividing the learning into a plurality of pieces of learning processing as follows. By formula (1), a plurality of the threshold values $\theta_{th}$ of the angle formed by the direction vector indicating the orientation of the virtual camera and the direction vector indicating the orientation of each imaging apparatus 101 is prepared in advance. Specifically, for example, as the threshold values $\theta_{th}$, a first threshold value $\theta_{th1}$ and a second threshold value $\theta_{th2}$ are prepared in advance. First, the identification unit 403 of the image processing apparatus 102 identifies the one or more imaging apparatuses 101 by using the first threshold value $\theta_{th1}$. Following this, the learning unit 404 of the image processing apparatus 102 performs learning using the captured image data of each imaging apparatus 101 identified by the identification unit 403 using the first threshold value $\theta_{th1}$ as learning image data. Following this, the identification unit 403 of the image processing apparatus 102 identifies the one or more imaging apparatuses 101 by using the second threshold value $\theta_{th2}$. Learning using the captured image data of each imaging apparatus 101 identified by the identification unit 403 using the second threshold value $\theta_{th2}$ as learning image data is performed. Following this, the learning unit 404 of the image processing apparatus 102 performs learning using the captured image data of all the imaging apparatuses 101 as learning image data.

Further, it may also be possible for the image processing apparatus 102 to change the weight of learning for each piece of learning image data, such as setting high the weight of learning in a case of learning using learning image data, which is the captured image data of the imaging apparatus 101 whose orientation or position is close to that of the virtual camera taken as important learning image data.

In the present embodiment, explanation is given on the assumption that the number of times of learning reaching the number of epochs is the termination condition of the learning processing of NeRF in the learning unit 404, but the termination condition of learning processing is not limited to this. For example, it may also be possible for the learning unit 404 to terminate learning of NeRF in a case where the amount of updating of the weight parameter of NeRF falls within a predetermined range or in a case where the amount of change in the image that is generated by NeRF becomes smaller than a predetermined reference as described above in Embodiment 1.

As above, in the present embodiment, the image processing apparatus 102 is configured so that in a case of learning of NeRF, not only the captured image data of the imaging apparatus 101 whose orientation or position is close to that of the virtual camera but also the captured image data of all the imaging apparatuses 101 is used as learning image data. According to the image processing apparatus 102 thus configured, even in a case where the number of imaging apparatuses 101 whose orientation or position is close to that of the virtual camera is small, it is possible to estimate radiance fields of the object with high accuracy and generate a virtual viewpoint image whose deterioration of image quality is slight while reducing the learning time of NeRF.

Embodiment 3

The image processing apparatus 102 according to Embodiment 1 and Embodiment 2 identifies the imaging apparatus 101 that outputs the captured image data used as learning image data based on the virtual camera information, that is, the position or orientation of the virtual camera. According to the image processing apparatus 102 according to Embodiment 1 and Embodiment 2, it is possible to reduce the learning time of NeRF by performing the learning by taking the captured image data of the imaging apparatus 101 thus identified as learning image data while giving importance to the learning. In Embodiment 3, an aspect is explained in which the learning condition of NeRF is determined based on the degree of importance of the object 106 and the learning of NeRF is performed based on the determined learning condition.

Figure 8:
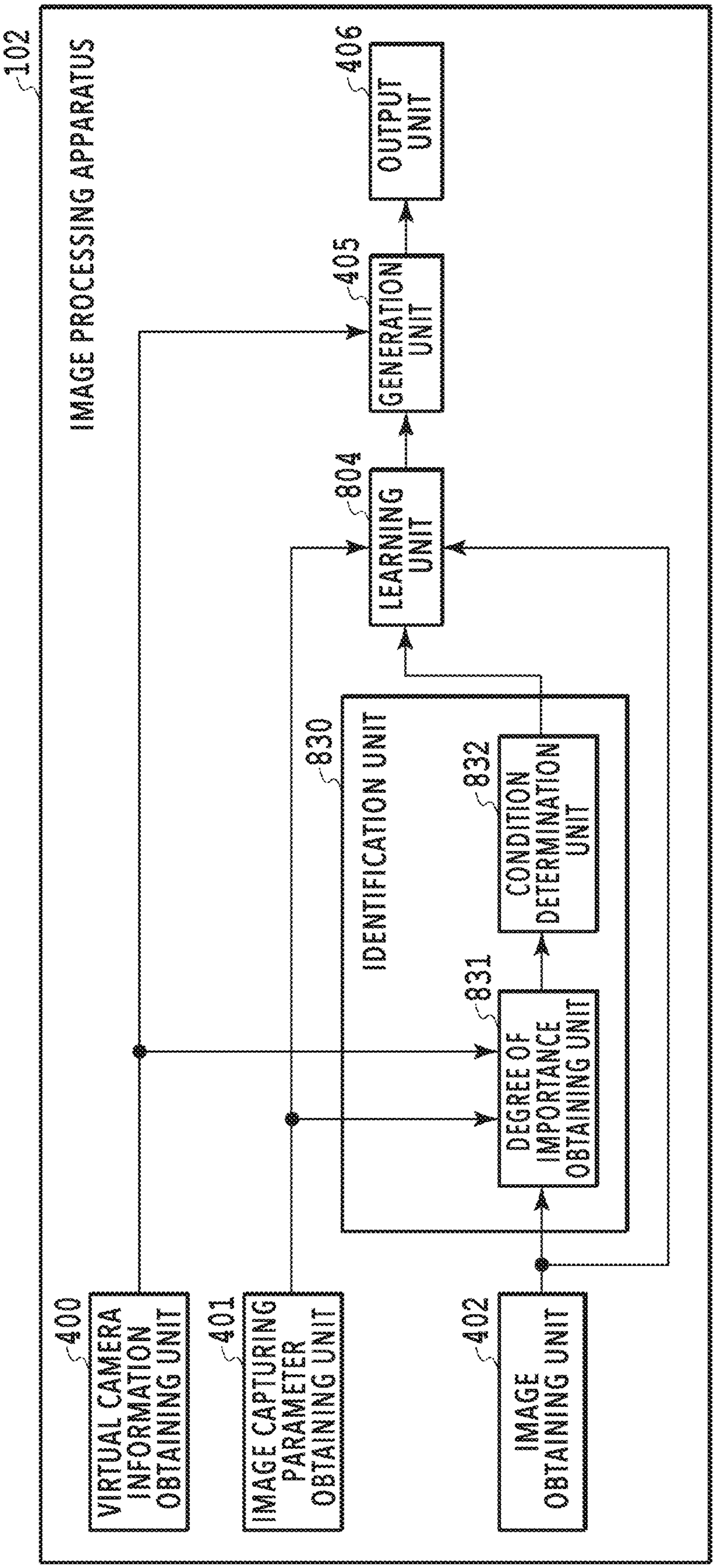
FIG. 8 is a block diagram showing one example of a function configuration of an image processing apparatus according to Embodiment 3.

FIG. 8 is a block diagram showing one example of the function configuration of the image processing apparatus 102 according to Embodiment 3 (in the following, simply described as "image processing apparatus 102"). The image processing apparatus 102 has the virtual camera information obtaining unit 400, the image capturing parameter obtaining unit 401, the image obtaining unit 402, an identification unit 830, a learning unit 804, the generation unit 405, and the output unit 406. That is, compared to the image processing apparatus 102 according to Embodiment 1, the image processing apparatus 102 is one in which the identification unit 403 and the learning unit 404 of the image processing apparatus 102 according to Embodiment 1 are changed to the identification unit 830 and the learning unit 804, respectively. In the following, among each unit shown in FIG. 8, to the unit configured to perform the same processing as that of each unit shown in FIG. 4, the same symbol as that in FIG. 4 is attached and explanation thereof is omitted.

The identification unit 830 identifies the imaging apparatus 101 that outputs the captured image data used as learning image data for learning of NeRF from among all the imaging apparatuses 101. The identification unit 830 has a degree of importance determination unit 831 and a condition determination unit 832. In the following, the processing of the degree of importance determination unit 831 and the condition determination unit 832 is explained. The degree of importance determination unit 831 determines the degree of importance of the object 106 based on the appearance of the object 106 from the virtual viewpoint, that is, the image area corresponding to the object 106 in the virtual viewpoint image (in the following, called "area of the object 106"). The degree of importance determination unit 831 determines the degree of importance of each object in a case where a plurality of objects is included within the viewing angle of the virtual camera. The condition determination unit 832 determines the learning condition in a case where learning of NeRF is performed based on the degree of importance of each object, which is determined by the degree of importance determination unit 831. In the following, as one example, a case is explained where three objects, that is, an object A, an object B, and an object C exist within the viewing angle of the virtual camera.

For example, in a case where the degree of importance of the object A is judged to be higher than the degree of importance of the other objects, the learning condition of NeRF is determined so that the radiance fields may be estimated with which the object A becomes an image of high quality in the virtual viewpoint image generated by the learned NeRF. The degree of importance of the object is determined based on the size of the area of the object 106 in the virtual viewpoint image. For example, the degree of importance of the object is determined so that the degree of importance of the object 106 whose area is larger becomes higher. The determination method of the degree of importance of the object 106 is not limited to the above-described method and for example, it may also be possible to determine the degree of importance of the object 106 by a user designating the object 106 the user desires to view with importance via the UI panel 103 or the like.

For example, the condition determination unit 832 determines the learning condition so that learning of NeRF is performed by using the captured image data of the imaging apparatus 101 capable of capturing the object 106 whose degree of importance is high within the viewing angle as learning image data more than the captured image data of the other imaging apparatuses 101. By the determination of the learning condition such as this, the amount of the captured image data used as learning image data for learning of NeRF is reduced and it is possible to estimate the radiance fields of an object whose degree of importance is high with high accuracy while reducing the learning time of NeRF.

Figure 9:
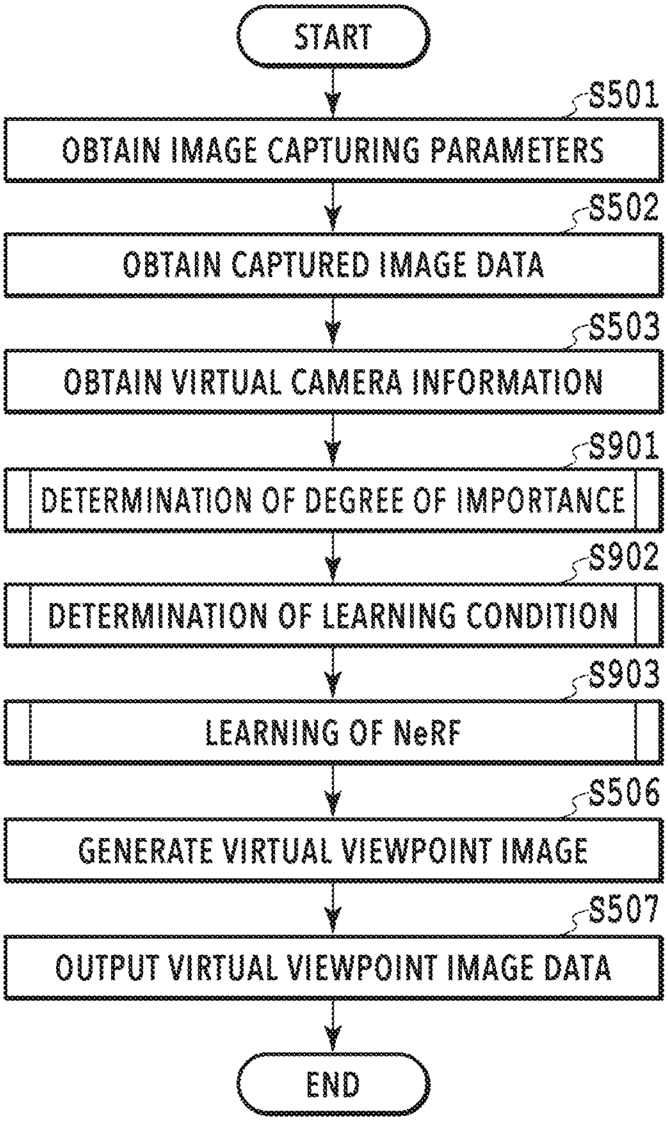
FIG. 9 is a flowchart showing one example of a series of processing flows of the image processing apparatus according to Embodiment 3.

With reference to FIG. 9 to FIG. 13, the operation of the image processing apparatus 102 is explained. FIG. 9 is a flowchart showing one example of a series of processing flows of the image processing apparatus 102 according to Embodiment 3. The processing at each step shown in the flowchart in FIG. 9 is implemented by the CPU 201 reading a predetermined program from the storage unit 203, loading the predetermined program onto the main memory 202, and executing the predetermined program. In the explanation of the flowchart shown in FIG. 9, to the step at which the same processing as that at the step shown in the flowchart in FIG. 5 is performed, the same symbol is attached and explanation thereof is omitted.

First, the image processing apparatus 102 performs the processing at S501 to S503. After S503, at S901, the degree of importance determination unit 831 determines the degree of importance of one or more objects existing in the image capturing-target area for each object. Details of the determination processing of the degree of importance of an object at S901 will be described later. After S901, at S902, the condition determination unit 832 determines the learning condition of NeRF based on the degree of importance of the object, which is determined at S901. Details of the determination processing of the learning condition at S902 will be described later. After S902, at S903, the learning unit 804 performs learning of NeRF based on the learning condition determined at S902 and transmits the learned NeRF, which is obtained as a result of the learning, to the generation unit 405. Details of the learning processing of NeRF at S903 will be described later. After S903, the image processing apparatus 102 performs the processing at S506 and S507 and after S507, the image processing apparatus 102 terminates the processing of the flowchart shown in FIG. 9.

Figure 10:
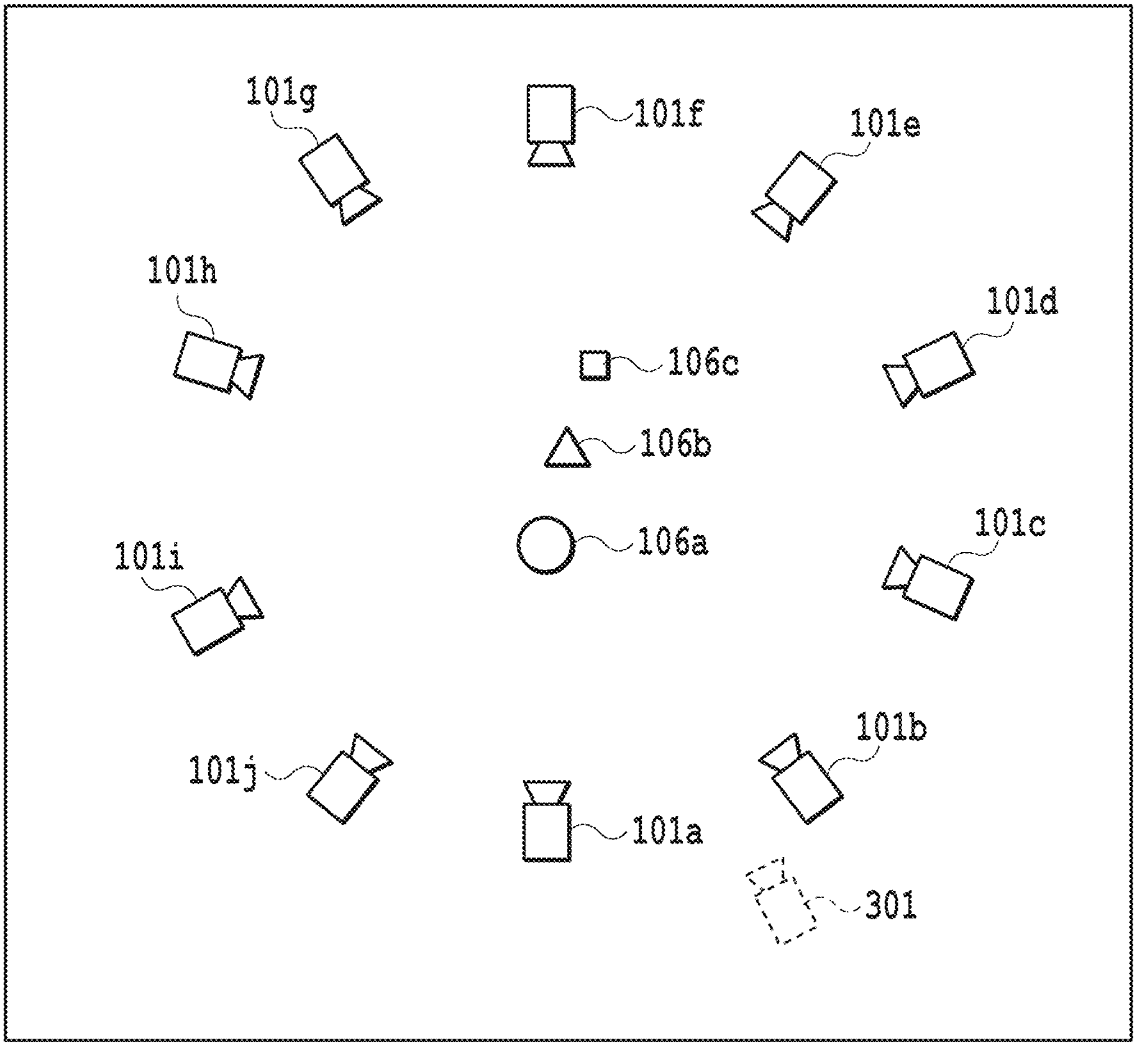
FIG. 10 is a diagram showing one example of arrangement of imaging apparatuses according to Embodiment 3.

FIG. 10 is a diagram showing one example of the arrangement of a plurality of the imaging apparatuses 101 and the object 106 existing in the image capturing-target area according to Embodiment 3. In FIG. 10, as one example, the arrangement of each of the ten imaging apparatuses 101 (101*a* to 101*j*) is shown. Further, in FIG. 10, as one example, the three objects 106 (106*a* to 106*c*) are shown. Furthermore, in FIG. 10, the position of the virtual camera 301 in the three-dimensional space is shown.

Figure 11A:
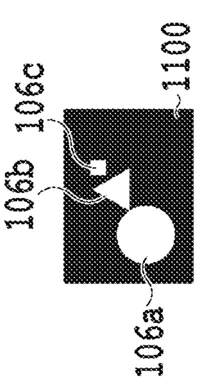
FIG. 11A to FIG. 11K are each a diagram showing one example of a captured image according to Embodiment 3.
Figure 11B:
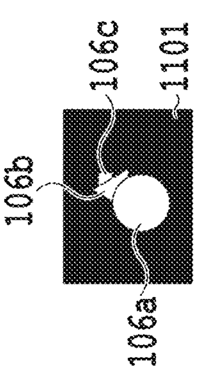
Figure 11C:
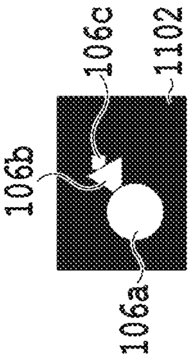
Figure 11D:
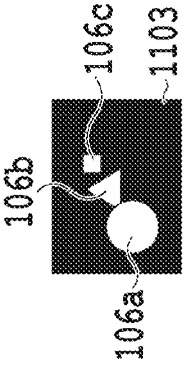
Figure 11E:
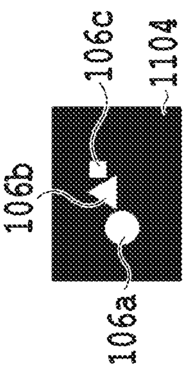
Figure 11F:
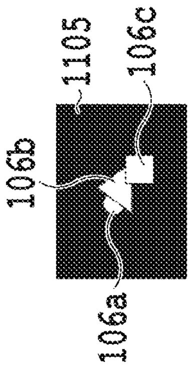
Figure 11G:
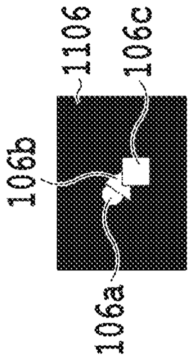
Figure 11H:
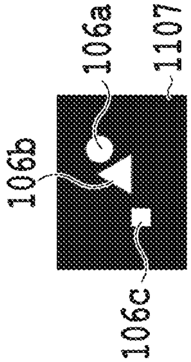
Figure 11I:
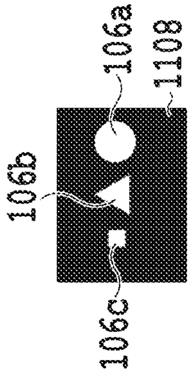
Figure 11J:
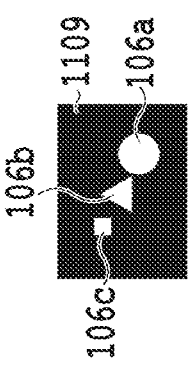
Figure 11K:
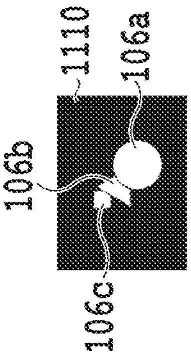

FIG. 11A to FIG. 11K are each a diagram showing one example of a captured image obtained by image capturing by each imaging apparatus 101 according to Embodiment 3. FIG. 11A shows one example of a virtual viewpoint image 1100 at the position and orientation of the virtual camera 301 and the virtual viewpoint image 1100 includes the image corresponding to each of the objects 106*a* to 106*c*. FIG. 11B shows one example of a captured image 1101 obtained by image capturing by the imaging apparatus 101*a* and the captured image 1101 includes the image corresponding to each of the objects 106*a* to 106*c*. FIG. 11C to FIG. 11K each show one example of each of captured images 1102 to 1110 obtained by image capturing by each of the imaging apparatuses 101*b* to 101*j* like FIG. 11B. Further, each of the captured images 1102 to 1110 includes the image corresponding to each of the objects 106*a* to 106*c*.

For example, first, the degree of importance determination unit 831 calculates the size of the area of each of the objects 106*a* to 106*c* in the virtual viewpoint image. Next, the degree of importance determination unit 831 determines the degree of importance of each object based on the calculated size of the area. Further, the degree of importance determination unit 831 calculates the size of the area of each of the objects 106*a* to 106*c* in each of the captured images 1101 to 1110. Next, the degree of importance determination unit 831 determines a degree of influence of the area of each object 106 for each of the captured images 1101 to 1110 based on the determined degree of importance of each object 106 and the size of the area of each object 106 in each of the captured images 1101 to 1110. Here, the degree of influence is an index representing the degree of influence that the learning image data exerts on the estimation accuracy of the radiance fields of each object 106 in a case where learning of NeRF is performed by using the captured image data of each imaging apparatus 101 as learning image data. Specifically, the degree of influence is an index representing the degree of influence that the area of each object 106 in the captured image used for learning of NeRF exerts on the image quality of the area of each object 106 in the virtual viewpoint image generated by the learned NeRF.

For example, the condition determination unit 832 determines the learning condition so that learning of NeRF is performed by using data of the captured image whose degree of influence of the area of each object 106 in the captured image is substantially the same as or higher than the degree of importance of the corresponding object 106 as learning image data. Further, it may also be possible for the condition determination unit 832 to set the learning condition so that learning of NeRF is performed with data of the captured image including the area of the object 106 whose degree of importance is higher being used as learning image data a larger number of times.

For example, in a case where the degree of importance is high in order of the object 106*a*, the object 106*b*, and the object 106*c*, the condition determination unit 832 determines the learning condition of NeRF so that the number of times of learning is $n_A > n_B > n_C$. Here, $n_A$ represents the number of times of learning of NeRF using data of the captured image including the area of the object 106*a* whose degree of importance is the highest as learning image data. Similarly, $n_B$ represents the number of times of learning of NeRF using data of the captured image including the area of the object 106*b* whose degree of importance is the second highest as learning image data. Similarly, $n_C$ represents the number of times of learning of NeRF using data of the captured image including the area of the object 106*c* whose degree of importance is the lowest as learning image data. In a case where the area of the object 106*c* in the virtual viewpoint image 1100 is very small, that is, the degree of importance of the object 106*c* is very low, it may also be possible for the condition determination unit 832 to set the value of $n_C$ to 0.

Further, it may also be possible for the condition determination unit 832 to determine the learning condition under which learning using the captured image data of all the imaging apparatuses 101 as learning image data (in the following, called "default learning") is performed, in addition to the above-described learning based on the degree of importance of the object 106. In this case, for example, on a condition that the total number of times of learning is n, the condition determination unit 832 sets the values of $n_A$, $n_B$, $n_C$, and $n_D$ so that the total value of $n_A$, $n_B$, $n_C$, and $n_D$ is n. Here, $n_D$ represents the number of times of learning of the default learning. In order to perform the learning based on the degree of importance of the object 106 sufficiently, it is recommended to set $n_D$ representing the number of times of learning of the default learning to a value as small as possible.

Figure 12:
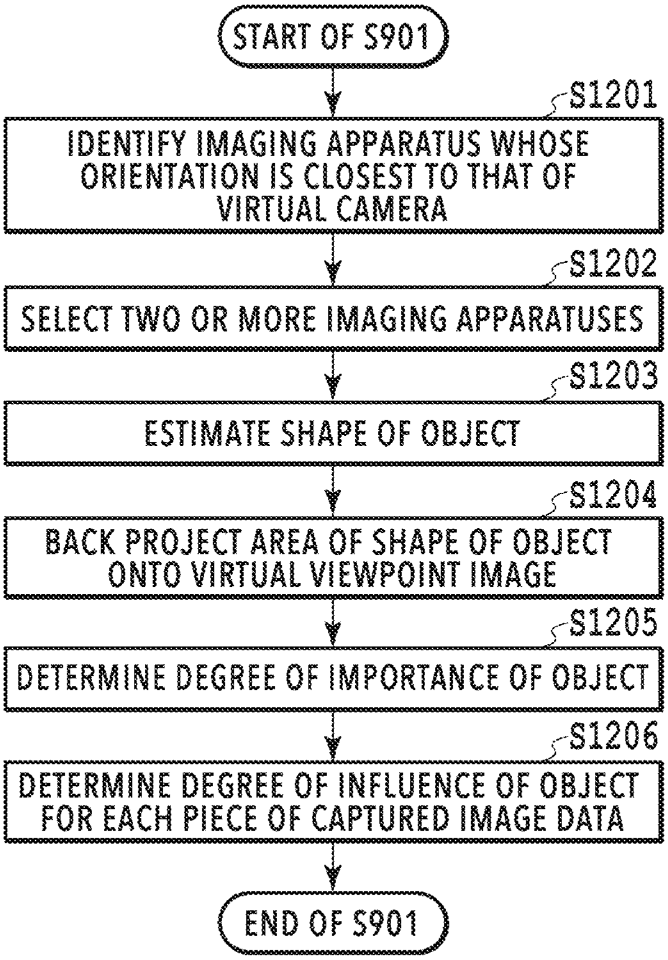
FIG. 12 is a flowchart showing one example of a flow of processing in a degree of importance determination unit according to Embodiment 3.

With reference to FIG. 12, the processing at S901 is explained. FIG. 12 is a flowchart showing one example of a flow of the processing in the degree of importance determination unit 831 according to Embodiment 3 and is a flowchart showing one example of a detailed flow of the processing at S901. This processing of the flowchart is performed after the processing at S503 shown in FIG. 9. First, at S1201, the degree of importance determination unit 831 identifies the imaging apparatus 101 whose orientation is the closest to that of the virtual camera 301. For example, the degree of importance determination unit 831 identifies the imaging apparatus 101 whose orientation is the closest to that of the virtual camera 301 based on the inner product value of the direction vector indicating the orientation of the virtual camera 301 and the direction vector indicating the orientation of the imaging apparatus 101 as in formula (1).

Next, at S1202, the degree of importance determination unit 831 selects the two or more imaging apparatuses 101 sparsely from among all the imaging apparatuses 101 with the imaging apparatus 101 identified at S1201 as a reference. The degree of importance determination unit 831 estimates a rough shape of the object 106 at the next step by using the two or more imaging apparatuses 101 selected at S1202. Because of this, it is preferable for the degree of importance determination unit 831 to select the two or more imaging apparatuses 101 arranged side by side at substantially the regular intervals, such as that the angle formed by the direction vectors of the orientation of the imaging apparatuses 101 is 60 degrees in the horizontal direction, from among all the imaging apparatuses 101.

Specifically, for example, the degree of importance determination unit 831 selects the one imaging apparatus 101 in every four imaging apparatuses 101 clockwise after selecting the imaging apparatus 101 whose orientation is the closest to that of the virtual camera from among all the imaging apparatuses 101 shown as one example in FIG. 3A. By the selection such as this, the five imaging apparatuses 101 shown as one example in FIG. 3C are selected. The more in number the imaging apparatuses 101 are selected, the higher the estimation accuracy of the shape of the object 106 becomes. However, the more in number the imaging apparatuses 101 are selected, the more the amount of calculation required for the shape estimation processing increases. Because of this, it is preferable to change the number of imaging apparatuses 101 to be selected or the intervals between the imaging apparatuses 101 in accordance with the use case.

After S1202, at S1203, the degree of importance determination unit 831 estimates the shape of the object 106 by using the captured image data of the imaging apparatus 101 selected at S1202 among the multi-viewpoint image data obtained at S502. For example, the degree of importance determination unit 831 estimates the shape of the object 106 by the visual hull (in the following, described as "VH") method. Specifically, first, the degree of importance determination unit 831 extracts the area of the object 106 from each captured image as a silhouette. Following this, the degree of importance determination unit 831 generates three-dimensional shape data by estimating the three-dimensional shape of the object 106 from the extracted silhouette and the image capturing parameters of the imaging apparatus 101, which are obtained at S501. Specifically, the degree of importance determination unit 831 projects the extracted silhouette onto the three-dimensional space based on the image capturing parameters of the imaging apparatus 101 and estimates by defining the product set of the projection areas as the shape of the object.

More specifically, first, the degree of importance determination unit 831 defines a three-dimensional space covered with voxels of a predetermined size. Following this, the degree of importance determination unit 831 projects each voxel with which the three-dimensional space is covered onto the two-dimensional captured image of each imaging apparatus 101 from the three-dimensional coordinates by using the image capturing parameters. The degree of importance determination unit 831 judges whether or not each projected voxel overlaps the extracted silhouette of the object 106 in each captured image. The degree of importance determination unit 831 regards the voxel for which the number of captured images in which it is judged that the voxel overlaps the silhouette is larger than or equal to a threshold value determined in advance as part of the shape of the object 106. For example, the degree of importance determination unit 831 initializes in advance the value of a flag of all the voxels to 0 in a case where the three-dimensional space is covered with voxels and changes the value of the flag of the voxel judged to be part of the shape of the object 106 to 1. The set of voxels whose value of the flag is 1 is three-dimensional shape data indicating the shape of the object 106.

In the present embodiment, explanation is given on the assumption that the degree of importance determination unit 831 estimates the shape of the object 106 by using the VH method, but the estimation method of the shape of the object 106 is not limited to the method using the reconstruction technique of a three-dimensional shape, such as the VH method. For example, it may also be possible for the degree of importance determination unit 831 to estimate the shape of the object 106 by using the learned model obtained as a result of deep learning or the like. In this case, the degree of importance determination unit 831 does not necessarily estimate the shape of the object 106 by using the captured image data of a plurality of the imaging apparatuses 101. For example, it may also be possible for the degree of importance determination unit 831 to estimate the shape of the object 106 by using only the captured image data of the one imaging apparatus 101, such as the captured image data of the imaging apparatus 101 identified at S1201.

After S1203, at S1204, the degree of importance determination unit 831 back projects the shape of the object 106 estimated at S1203 onto the virtual viewpoint image scheduled to be generated based on the virtual camera information. However, in a case where a plurality of the objects 106 exists, it is assumed that consistency is established between the virtual camera and the imaging apparatus 101 as regards which object 106 the area of the shape of each object 106 corresponds to in a case of back projection. Next, at S1205, the degree of importance determination unit 831 determines the degree of importance of the object 106 based on the size of the silhouette of the object 106 in the virtual viewpoint image back projected at S1204, that is, the size of the area of the object 106 in the virtual viewpoint image. In the following, explanation is given on the assumption that the size of the area of the object 106 is determined by the number of pixels included in the area, but it may also be possible to determine the size of the area of the object 106 by another index, such as the maximum value of the pixel in the vertical direction or the transverse direction of the area.

For example, in a case where the area of the shape of each of the objects 106*a* to 106*c* is back projected onto the virtual viewpoint image, it is assumed that the size of the silhouette of the object 106*a* in the virtual viewpoint image is 500 pixels. Further, it is assumed that the size of the silhouette of the object 106*b* in the virtual viewpoint image is 300 pixels and the size of the silhouette of the object 106*c* is 200 pixels. In this case, for example, the degree of importance determination unit 831 determines that the degree of importance of each of the objects 106*a*, 106*b*, and 106*c* is 0.5, 0.3, and 0.2 in this order.

In the example described above, explanation is given on the assumption that the degree of importance of the object 106 is determined based on only the size of the area of the object 160 in the virtual viewpoint image, but in addition to this, the degree of the importance may be determined based a temporary degree of importance set in advance by a user. For example, a user sets in advance the temporary degree of importance for the degree of importance of the object 106. It is possible for a user to freely set the temporary degree of importance of the object 106 based on the type of the object 106 and the degree of importance of the object 106 considered by the user depending on the interest, concern and the like of the user. For example, in this case, the degree of importance determination unit 831 calculates the true degree of importance by performing predetermined weighting based on the temporary degree of importance set in advance for each object 106 for the degree of importance determined based on the size of the area of the object 106 in the virtual viewpoint image.

Specifically, for example, a user sets in advance 0.2, 0.8, and 0.0 in this order as temporary degrees of importance for each of the object 106*a*, the object 106*b*, and the object 106*c*. For example, the degree of importance determination unit 831 determines the true degree of importance by multiplying the temporary degree of importance set in advance and the ratio of the sizes of the areas between the objects 106 in the virtual viewpoint image. That is, in a case where the ratio of the sizes of the areas between the objects 106 corresponding to certain of the objects 106 is taken to be $I_s$ and the temporary degree of importance set by a user is taken to be $I_u$, a true degree of importance I of the certain of the objects 106 is expressed as formula (3) below.

$$I = I_s \times I_u \quad \text{formula (3)}$$

For example, in the case described above, the true degrees of importance of each of the object 106*a*, the object 106*b*, and the object 106*c* are 0.5×0.2=0.1, 0.3× 0.8=0.24, and 0.2×0.0=0.00 in this order. It may also be possible for the degree of importance determination unit 831 to correct the degree of importance so that the total of the degrees of importance of each object 106 is 1. In a case of the above-described example, the true degrees of importance of each of the object 106*a*, the object 106*b*, and the object 106*c* are 0.29, 0.71, and 0.00 in this order.

After S1205, at S1206, the degree of importance determination unit 831 determines a degree of influence in a case where learning is performed by using the captured image data of each imaging apparatus 101 as learning image data based on the size of the area of each object 106 in the captured image of each imaging apparatus 101. Specifically, for example, the degree of importance determination unit 831 determines the degree of influence in a case where learning of NeRF is performed by the same method as the determination method of the degree of importance of the object 106 at S1205. More specifically, for example, the degree of importance determination unit 831 determines the degree of influence of each object 106 for each piece of captured image data based on the ratio of the sizes of the areas between each object 106 in the captured image of each imaging apparatus 101.

As information on the size of the area of each object 106 in the captured image of each imaging apparatus 101, it is possible to use information on the size of the silhouette of the object 106, which is extracted in a case where the shape of the object is estimated by using the VH method at S1203. In a case where the silhouette of the object 106 is not extracted at S1203, it is sufficient to calculate the size of the silhouette of the object 106 in a case where the area of the shape of the object 106, which is estimated at S1203, is back projected onto the captured image of each imaging apparatus 101. However, in a case where a plurality of the objects 106 exists, it is assumed that consistency is established between the virtual camera and the imaging apparatus 101 as regards which object 106 the area of the shape of each object 106 corresponds to in a case of back projection. After S1206, the degree of importance determination unit 831 terminates the processing of the flowchart shown in FIG. 12, that is, the processing at S901.

Figure 13:
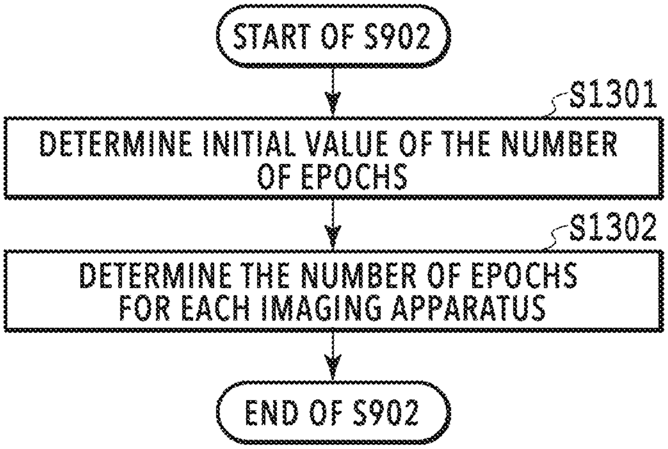
FIG. 13 is a flowchart showing one example of a flow of processing in a condition determination unit according to Embodiment 3.

With reference to FIG. 13, the processing at S902 is explained. FIG. 13 is a flowchart showing one example of a flow of the processing in the condition determination unit 832 according to Embodiment 3 and is a flowchart showing one example of a detailed flow of the processing at S902. This processing of the flowchart is performed after the processing at S901 shown in FIG. 9. First, at S1301, the condition determination unit 832 determines the number of times of learning (number of epochs) of the default learning. Here, the default learning is learning using each piece of captured image data of all the imaging apparatuses 101 as learning image data in learning of NeRF as described above in Embodiment 2. Further, the number of times of learning (number of epochs) of the default learning represents how many times learning using captured image data as learning image data is performed for each piece of captured image data in the default learning. At the step after this, the condition determination unit 832 determines the number of epochs of the learning using the captured image data whose degree of influence is high as learning image data. Because of this, it is preferable for the condition determination unit 832 to determine a value as small as possible for the number of epochs of the default learning in order to increase the number of epochs.

Next, at S1302, the condition determination unit 832 determines the number of epochs for each imaging apparatus 101 based on the degree of importance of each object 106 determined at S901 and the degree of influence of each object 106 for each piece of captured image data. For example, the condition determination unit 832 determines the number of epochs of the imaging apparatus 101 so that the number of times of learning using the captured image data having the degree of influence of the object 106, which is substantially the same as or higher than the degree of importance of the object 106, as learning image data is increased. Specifically, for example, the condition determination unit 832 determines the number of epochs of the imaging apparatus 101 so that the number of times of learning using the captured image data having the degree of influence higher than a threshold value as learning image data by taking a value several percent lower than the degree of importance of each of the objects 106_a_ to 106_c_ as a threshold value.

For example, the condition determination unit 832 determines to perform learning $n_A$ times for each piece of learning image data by using each piece of captured image data having the degree of influence higher than the threshold value of the degree of importance of the object 160_a_ among all the captured image data configuring the multi-viewpoint image data as learning image data. Similarly, the condition determination unit 832 determines to perform learning $n_B$ times for each piece of learning image data by using each piece of captured image data having the degree of influence higher than the threshold value of the degree of importance of the object 160_b_ as learning image data. Further, similarly, the condition determination unit 832 determines to perform learning $n_C$ times for each piece of learning image data by using each piece of captured image data having the degree of influence higher than the threshold value of the degree of importance of the object 160_c_ as learning image data. In this case, in all the objects 106_a_ to 106_c_, for the captured image data having the degree of influence higher than the threshold value of the degree of importance, the number of times of learning is the total value of $n_A$, $n_B$, $n_C$, and $n_D$. Here, $n_D$ is the number of epochs of the default learning.

It may also be possible for the condition determination unit 832 to determine the number of times of learning in accordance with the degree of importance of each object 106 for each piece of learning image data. That is, it may also be possible for the condition determination unit 832 to determine the values of $n_A$, $n_B$, and $n_C$ so that learning of NeRF is performed a larger number of times by using data of the captured image including the area of the object whose degree of importance is higher as learning image data. Specifically, in a case where the degree importance of each object 106 is high in order of the object 106_a_, the object 106_b_, and the object 106_c_, the condition determination unit 832 determines the values of $n_A$, $n_B$, and $n_C$ so that the value is small in order of $n_A$, $n_B$, and $n_C$.

Further, in the present embodiment, explanation is given on the assumption that learning is performed a larger number of times by using the captured image data whose degree of influence is higher than the threshold value of the degree of importance as learning image data, but the determination of the number of epochs is not limited to this. For example, it may also be possible for the condition determination unit 832 to reduce the number of epochs of learning using the captured image data having the degree of influence lower than the threshold value of the degree of importance as learning image data. Further, for example, it may also be possible for the condition determination unit 832 to increase the number of epochs of learning using the captured image data having the degree of influence substantially the same as the degree of importance as learning image data.

After S1302, the condition determination unit 832 terminates the processing of the flowchart shown in FIG. 13, that is, the processing at S902. After S902, the image processing apparatus 102 performs the processing at S903. Specifically, as descried above, after S902, at S903, the learning unit 804 performs learning of NeRF based on the learning condition determined at S902. More specifically, at S903, the learning unit 804 performs learning of NeRF using the captured image data of each imaging apparatus 101 as learning image data in accordance with the number of epochs corresponding to each imaging apparatus 101, which is determined at S1302.

In the present embodiment, explanation is given on the assumption that the number of times of learning reaching the number of epochs determined at S1302 is the termination condition of learning processing of NeRF in the learning unit 804, but the termination condition of learning processing is not limited to this. For example, as described above in Embodiment 1 and Embodiment 2, it may also be possible for the learning unit 804 to terminate learning of NeRF in a case where the amount of updating of the weight parameter of NeRF falls within a predetermined range or in a case where the amount of change in the image that is generated by NeRF becomes smaller than a predetermined reference. Further, in this case, it may also be possible for the learning unit 804 to change the termination condition of learning depending on the captured image data used for learning of NeRF as learning image data. For example, it may also be possible for the learning unit 804 to make stricter the termination condition of learning for the learning using the captured image data having the degree of influence substantially the same as or higher than the degree of importance as learning image data. Further, for example, it may also be possible for the learning unit 804 to make less strict the termination condition of learning for the learning using the captured image data having the degree of influence lower than the degree of importance as learning image data.

Further, it may also be possible for the learning unit 804 to change the weight of learning of NeRF for each piece of learning image data depending on the captured image data used as learning image data for learning of NeRF. For example, it may also be possible for the learning unit 804 to set high the weight of learning of NeRF in a case of the learning using the captured image data having the degree of influence higher than the degree of importance as learning image data by regarding the captured image data as important image data in learning of NeRF. On the contrary, it may also be possible for the learning unit 804 to set low the weight of learning of NeRF in a case of the learning using the captured image data having the degree of influence lower than the degree of importance as learning image data by regarding the captured image data as unimportant image data in learning of NeRF.

In the present embodiment, explanation is given on the assumption that the degree of importance of each object 106 is determined by back projecting the area of the estimated shape of each object 106 onto the virtual viewpoint image scheduled to be generated and based on the size of the silhouette of each object 106 in the virtual viewpoint image. Further, in the present embodiment, explanation is given on the assumption that the degree of influence of each object 106 is determined based on the size of the silhouette corresponding to each object 106, which is extracted from the captured image of each imaging apparatus 101. However, the method of determining the degree of importance or the degree of influence of the object 106 is not limited to the method described above.

For example, the degree of importance may also be determined based on the distance from the virtual camera to the object 106, which can be calculated based on the estimated three-dimensional shape of the object 106 and the position and orientation of the virtual camera. Specifically, it may also be possible for the degree of importance determination unit 831 to determine the degree of importance of each object 106 in accordance with the distance from the virtual camera so that the degree of importance is higher for the object 106 closer to the position of the virtual camera. Similarly, the degree of influence may be determined based on the distance from the imaging apparatus 101 to the object

106, which can be calculated based on the estimated three-dimensional shape of the object 106 and the position and orientation of each imaging apparatus 101. Specifically, it may also be possible for the degree of importance determination unit 831 to determine the degree of influence of each object 106 in accordance with the distance from the imaging apparatus 101 so that the degree of influence is higher for the object 106 closer to the position of the imaging apparatus 101. Further, for example, it may also be possible for the degree of importance determination unit 831 to use the volume of the estimated three-dimensional shape of each object 106 as an index for the determination of the degree of importance and the degree of influence. Furthermore, for example, it may also be possible to use the volume of the estimated three-dimensional shape of each object 106 and the above-described distance to the object 106 as an index for the determination of the degree of importance and the degree of influence.

As above, in the present embodiment, the image processing apparatus 102 is configured so that the learning condition in a case where learning of NeRF is performed is determined based on the estimated three-dimensional shape of the object. According to the image processing apparatus 102 thus configured, it is possible to reduce the number of times of learning of NeRF using data of the captured image in which the object 106 whose degree of importance is high is not captured as learning image data and it is made possible to reduce the learning time of NeRF. Further, according to the image processing apparatus 102, it is possible to estimate the radiance fields of the object 106 whose degree of importance is high with high accuracy and generate a virtual viewpoint image whose deterioration of image quality is slight in the area of the object 106 while reducing the learning time of NeRF.

Embodiment 4

The image processing apparatus 102 according to Embodiment 3 determines the degree of importance of the object 106 by back projecting the area of the shape of the object 106, which is estimated roughly by using the VH method, and based on the size of the area of the object 106 in the virtual viewpoint image. Further, the image processing apparatus 102 according to Embodiment 3 determines the degree of influence of the object 106 in the captured image data used as learning image data for learning of NeRF based on the size of the area of the object 106 in each captured image. Furthermore, the image processing apparatus 102 according to Embodiment 3 determines the number of times of learning (number of epochs) in a case where captured image data is used as learning image data based on the determined degree of importance of the object 106 and the determined degree of influence of the object. Here, the estimation processing of the three-dimensional shape of the object 106 by the VH method or the like requires a large amount of calculation and a long processing time. Consequently, in Embodiment 4, an aspect is explained in which the shape of the object 106 is not estimated but the size of the area of the object 106 in a virtual viewpoint image is estimated from data of a captured image, which is a two-dimensional image.

The function configuration of the image processing apparatus 102 according to Embodiment 4 is the same as the function configuration of the image processing apparatus 102 according to Embodiment 3 and only the processing of the degree of importance determination unit 831 according to Embodiment 4 is different from the processing of the degree of importance determination unit 831 according to Embodiment 3. That is, at each step in the flowchart shown in FIG. 9, among the processing of the image processing apparatus 102 according to Embodiment 4, only the processing at S901 is different from the processing of the image processing apparatus 102 according to Embodiment 3. In the following, the image processing apparatus 102 according to Embodiment 4 is simply described as "image processing apparatus 102".

Figure 14:
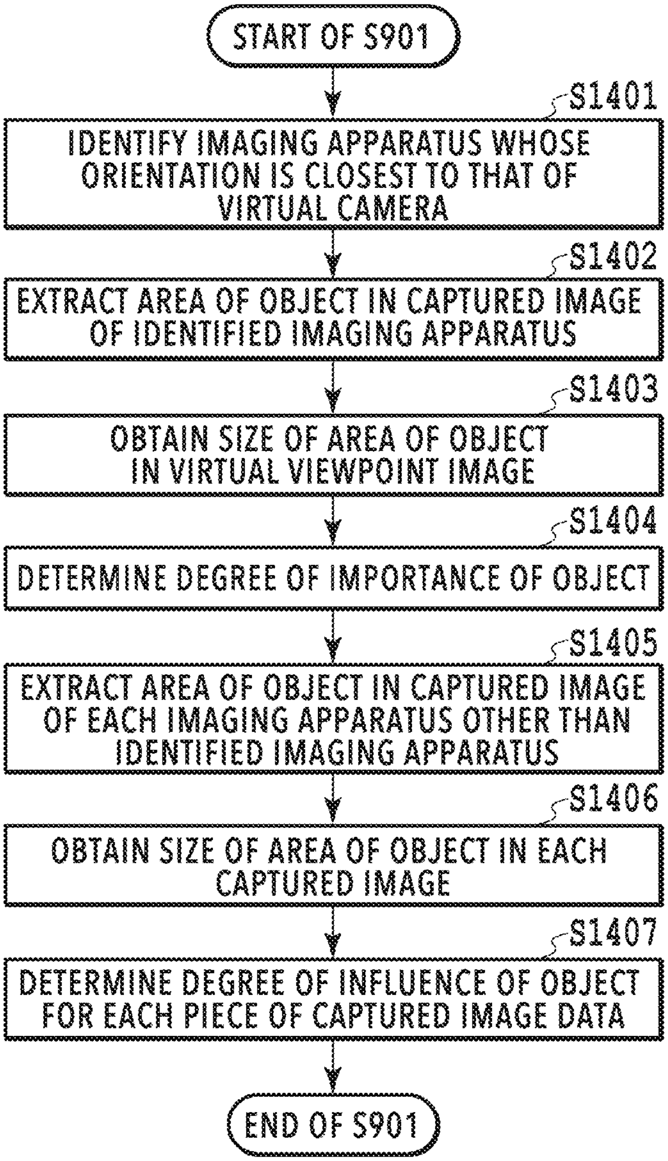
FIG. 14 is a flowchart showing one example of a flow of processing in a degree of importance determination unit according to Embodiment 4.

FIG. 14 is a flowchart showing one example of a flow of the processing of the degree of importance determination unit 831 according to Embodiment 4 and is a flowchart showing one example of a detailed flow of the processing at S901 shown in FIG. 9. The degree of importance determination unit 831 according to Embodiment 4 (in the following, simply described as "degree of importance determination unit 831") extracts the area of the object 106 in a captured image by performing two-dimensional segmentation for the captured image. Specific steps are as follows.

First, at S1401, the degree of importance determination unit 831 identifies the imaging apparatus 101 whose orientation is the closest to that of the virtual cameral like the degree of importance determination unit 831 according to Embodiment 3. Next, at S1402, the degree of importance determination unit 831 extracts the area of the object 106 in the captured image of the imaging apparatus 101 identified at S1401. Specifically, the degree of importance determination unit 831 extracts the area of the object 106 by performing two-dimensional segmentation for the captured image and separating the main area of the object 106 from the background area in the captured image. For example, the degree of importance determination unit 831 performs segmentation for the captured image by using the image processing method, such as the SNAKE method, the level set method, or the foreground/background separation method. The method of segmentation is not limited to the method by the image processing as described above. For example, it may also be possible for the degree of importance determination unit 831 to perform segmentation for the captured image by using the learned model obtained as a result of deep learning, such as semantic segmentation. By using the method such as this, it is possible for the degree of importance determination unit 831 to extract the area of each object 106 in the captured image.

In a case where a plurality of the objects 106 exists in the image capturing-target area, as regards which object 106 each of the plurality of areas of the plurality of the objects 106 corresponds to, for example, labeling is performed for each area of the object 106 after segmentation is performed. Further, it may also be possible for the degree of importance determination unit 831 to perform segmentation by taking into consideration the known label in a case of performing segmentation. However, it is assumed that consistency is established between the imaging apparatuses 101 as regards which object 106 the area of the object 106 corresponds to in a case where segmentation is performed.

Next, at S1403, the degree of importance determination unit 831 obtains the number of pixels included in the area of each object 106, which is extracted at S1402, and obtains the obtained number of pixels as the size of the area of the object 106 in the virtual viewpoint image. Here, in the present embodiment, the degree of importance determination unit 831 does not perform the estimation of the three-dimensional shape of the object 106. Because of that, it is not possible for the degree of importance determination unit 831 to directly calculate the size of the area of the object 106 in the virtual viewpoint image. Consequently, the degree of importance determination unit 831 regards the size of the area of the object 106 in the captured image of the imaging apparatus 101 identified at S1401 as the size of the area of the object 106 in the virtual viewpoint image.

Next, at S1404, the degree of importance determination unit 831 determines the degree of importance of each object 106. The determination processing of the degree of importance of the object 106 at S1404 is the same as the determination processing of the degree of importance of the object 106 at S1205 shown in FIG. 12, and therefore, explanation is omitted. Next, at S1405, the degree of importance determination unit 831 extracts the area of each object 106 in the captured image of each imaging apparatus 101 other than the imaging apparatus 101 identified at S1401 among all the imaging apparatuses 101. The extraction method of the area of the object 106 at S1405 is the same as the extraction method of the area of the object 106 at S1402, and therefore, explanation is omitted.

Next, at S1406, the degree of importance determination unit 831 obtains the number of pixels included in the area of each object 106, which is extracted at S1405, and obtains the obtained number of pixels as the size of the area of the object 106 in each captured image. Further, the degree of importance determination unit 831 obtains the number of pixels included in the area of each object 106, which is extracted at S1402, and obtains the obtained number of pixels as the size of the area of the object 106 in the captured image of the imaging apparatus 101 identified at S1401. As described in the explanation of the processing at S1402, it is assumed that consistency is established between the imaging apparatuses 101 as regards which object 106 the area of the plurality of the objects 106 corresponds to in a case where segmentation is performed.

Next, at S1407, the degree of importance determination unit 831 determines the degree of influence in a case where learning of NeRF is performed based on the degree of importance of each object 103, which is determined at S1404, and the size of the area of each object 106 in each captured image, which is obtained at S1406. Specifically, the degree of importance determination unit 831 determines the degree of influence of the object 106 in the captured image data used as learning image data for learning of NeRF based on the degree of importance of each object 106 and the size of the area of each object 106 in each captured image. The determination processing of the degree of influence of the object 106 at S1407 is the same as the determination processing of the degree of influence of the object 106 at S1206 shown in FIG. 12, and therefore, explanation is omitted. After S1407, the image processing apparatus 102 terminates the processing of the flowchart shown in FIG. 14, that is, the processing at S901 shown in FIG. 9.

In the present embodiment, as the method of identifying the imaging apparatus 101 that captures the captured image close to the virtual viewpoint image in how the object 106 is captured, the orientation of the virtual camera and the orientation of the imaging apparatus 101 are compared as at S1401. However, the identification method of the imaging apparatus 101 is not limited to the above-described method. For example, in a case where the object 106 exists at the center of the stage, or at a specific position, such as the center of the image capturing-target area as in FIG. 1, the size of the area of the object 106 in each captured image is determined by the position, orientation, viewing angle and the like of each imaging apparatus 101. Consequently, it may also be possible for the degree of importance determination unit 831 to identify the imaging apparatus 101 that captures the captured image close to the virtual viewpoint image in how the object 106 is captured by using at least one of these image capturing parameters.

As above, in the present embodiment, the image processing apparatus 102 is configured so as to obtain the size of the area of the object 106 in the virtual viewpoint image and each captured image by performing two-dimensional segmentation for the captured image, which is a two-dimensional image. Further, the image processing apparatus 102 is configured so as to determine the degree of importance of the object 106 based on the size of the area of the object 106 in the virtual viewpoint image, which is thus obtained. Furthermore, the image processing apparatus 102 is configured so as to determine the degree of influence of the object 106 for each piece of captured image data based on the determined degree of importance of the object 106 and the size of the area of the object 106 in each captured image, which is thus obtained. According to the image processing apparatus 102 thus configured, it is possible to determine the learning condition without performing the estimation of the three-dimensional shape of the object 106, and therefore, it is possible to reduce the time required for preprocessing of learning of NeRF, and as a result, it is possible to reduce the time required for the whole learning processing of NeRF.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to reduce the time required for learning of NeRF.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-145555, filed Sep. 7, 2023, which is hereby incorporated by reference wherein in its entirety.

What is claimed is:

1. An image processing apparatus comprising:

one or more hardware processors; and one or more memories storing one or more programs configured to be executed by the one or more hardware processors, the one or more programs including instructions for:

obtaining image capturing parameters of each of a plurality of imaging apparatuses arranged at positions different from one another;

obtaining data of a captured image obtained by image capturing by each of the plurality of imaging apparatuses;

obtaining virtual viewpoint information including at least one of information indicating a position of a virtual viewpoint and information indicating a viewing direction from the virtual viewpoint;

determining a learning condition of a learning model estimating radiance fields corresponding to an object existing in an image capturing area of the plurality of imaging apparatuses based on the virtual viewpoint information;

performing learning of the learning model based on the learning condition, the image capturing parameters, and data of the captured image;

obtaining a virtual viewpoint image corresponding to an appearance from the virtual viewpoint based on the virtual viewpoint information; and determining a degree of importance of the object in a case where the learning of the learning model is performed based on an object area, which is an image area corresponding to the object in the obtained virtual viewpoint image, wherein the determining of the learning condition is performed based on the determined degree of importance of the object.

2. The image processing apparatus according to claim 1, wherein the one or more programs further include instructions for:

estimating a three-dimensional shape of the object by using at least part of obtained data of a plurality of the captured images; and identifying an object area in the virtual viewpoint image based on the virtual viewpoint information and an estimated three-dimensional shape of the object.

3. The image processing apparatus according to claim 2, wherein the estimating of a three-dimensional shape of the object is performed based on at least part of obtained data of a plurality of the captured images by using a three-dimensional shape reconstruction technique or a learned model obtained as a result of deep learning.

4. The image processing apparatus according to claim 1, wherein the one or more programs further include instructions for:

identifying the object area in the virtual viewpoint image by using at least one of an image segmentation technique and a foreground/background separation technique of an image.

5. The image processing apparatus according to claim 1, wherein the one or more programs further include instructions for:

identifying an imaging apparatus that captures the captured image matching to an appearance from the virtual viewpoint from among the plurality of imaging apparatuses based on the virtual viewpoint information and the image capturing parameters; and identifying the object area in the captured image obtained by image capturing by an identified imaging apparatus as the object area in the virtual viewpoint image.

6. The image processing apparatus according to claim 5, wherein the one or more programs further include instructions for:

identifying the object area in the captured image obtained by image capturing by an identified imaging apparatus by using at least one of an image segmentation technique and a foreground/background separation technique of an image.

7. The image processing apparatus according to claim 5, wherein the virtual viewpoint information includes information indicating a position of the virtual viewpoint and the identifying of an imaging apparatus that captures the captured image matching to an appearance from the virtual viewpoint is performed based on information indicating a position of the virtual viewpoint and information indicating a position of an imaging apparatus included in the image capturing parameters.

8. The image processing apparatus according to claim 5, wherein the virtual viewpoint information includes information indicating a viewing direction from the virtual viewpoint and the identifying of an imaging apparatus that captures the captured image matching to an appearance from the virtual viewpoint is performed based on information indicating a viewing direction from the virtual viewpoint and information indicating a direction of a optical axis of an imaging apparatus included in the image capturing parameters.

9. The image processing apparatus according to claim 5, wherein the virtual viewpoint information includes information indicating extent of a field of vision from the virtual viewpoint and the identifying of an imaging apparatus that captures the captured image matching to an appearance from the virtual viewpoint is performed based on information indicating extent of a field of vision from the virtual viewpoint and information indicating a viewing angle of an imaging apparatus included in the image capturing parameters.

10. The image processing apparatus according to claim 1, wherein the one or more programs further include instructions for:

determining a number of times of the learning of the learning model using data of the captured image for each piece of data of the captured images based on a degree of importance of the object.

11. The image processing apparatus according to claim 1, wherein the one or more programs further include instructions for:

determining a convergence condition of a weight parameter included in the learning model, which is used as a termination condition of the learning model, based on a degree of importance of the object.

12. The image processing apparatus according to claim 11, wherein the determining of the convergence condition is performed based on a degree of importance of the object and how the object is captured in the captured image used for the learning model.

13. An image processing apparatus comprising:

one or more hardware processors; and one or more memories storing one or more programs configured to be executed by the one or more hardware processors, the one or more programs including instructions for:

obtaining image capturing parameters of each of a plurality of imaging apparatuses arranged at positions different from one another;

obtaining data of a captured image obtained by image capturing by each of the plurality of imaging apparatuses;

obtaining virtual viewpoint information including at least one of information indicating a position of a virtual viewpoint and information indicating a viewing direction from the virtual viewpoint;

determining a learning condition of a learning model estimating radiance fields corresponding to an object existing in an image capturing area of the plurality of imaging apparatuses based on the virtual viewpoint information;

performing learning of the learning model based on the learning condition, the image capturing parameters, and data of the captured image;

estimating a three-dimensional shape of the object by using at least part of obtained data of a plurality of the captured images; and determining a degree of importance of the object by using at least one of information indicating a volume of the object obtained based on an estimated three-dimensional shape of the object and information indicating a distance from a position of the virtual viewpoint obtained based on an estimated three-dimensional shape of the object to the object, wherein the determining of the learning condition is performed based on the determined degree of importance of the object.

14. An image processing apparatus comprising:

one or more hardware processors; and one or more memories storing one or more programs configured to be executed by the one or more hardware processors, the one or more programs including instructions for:

obtaining image capturing parameters of each of a plurality of imaging apparatuses arranged at positions different from one another;

obtaining data of a captured image obtained by image capturing by each of the plurality of imaging apparatuses;

obtaining virtual viewpoint information including at least one of information indicating a position of a virtual viewpoint and information indicating a viewing direction from the virtual viewpoint;

determining a learning condition of a learning model estimating radiance fields corresponding to an object existing in an image capturing area of the plurality of imaging apparatuses based on the virtual viewpoint information;

performing learning of the learning model based on the learning condition, the image capturing parameters, and data of the captured image; and determining a degree of importance of the object in a case where the learning of the learning model is performed based on the virtual viewpoint information and information indicating a type of the object, wherein the determining of the learning condition is performed based on the determined degree of importance of the object.

15. The image processing apparatus according to claim 14, wherein the one or more programs further include instructions for:

estimating radiance fields corresponding to the object by using a learned model, the learning model for which learning has been performed; and generating a virtual viewpoint image corresponding to an appearance from the virtual viewpoint, the virtual viewpoint information includes information indicating a position of the virtual viewpoint and information indicating a viewing direction from the virtual viewpoint, and the generating of the virtual viewpoint image is performed by inputting the virtual viewpoint information to the learned model.

16. The image processing apparatus according to claim 15, wherein the one or more programs further include instructions for:

displaying and outputting the virtual viewpoint image on a display device by performing display control.

17. An image processing method comprising the steps of:

obtaining image capturing parameters of each of a plurality of imaging apparatuses arranged at positions different from one another;

obtaining data of a captured image obtained by image capturing by each of the plurality of imaging apparatuses;

obtaining virtual viewpoint information including at least one of information indicating a position of a virtual viewpoint and information indicating a viewing direction from the virtual viewpoint;

determining a learning condition of a learning model estimating radiance fields corresponding to an object existing in an image capturing area of the plurality of imaging apparatuses based on the virtual viewpoint information;

performing learning of the learning model based on the learning condition, the image capturing parameters, and data of the captured image;

obtaining a virtual viewpoint image corresponding to an appearance from the virtual viewpoint based on the virtual viewpoint information; and determining a degree of importance of the object in a case where the learning of the learning model is performed based on an object area, which is an image area corresponding to the object in the obtained virtual viewpoint image, wherein the determining of the learning condition is performed based on the determined degree of importance of the object.

18. A non-transitory computer readable storage medium storing a program for causing a computer to perform a control method of an image processing apparatus, the control method comprising the steps of:

obtaining image capturing parameters of each of a plurality of imaging apparatuses arranged at positions different from one another;

obtaining data of a captured image obtained by image capturing by each of the plurality of imaging apparatuses;

obtaining virtual viewpoint information including at least one of information indicating a position of a virtual viewpoint and information indicating a viewing direction from the virtual viewpoint;

determining a learning condition of a learning model estimating radiance fields corresponding to an object existing in an image capturing area of the plurality of imaging apparatuses based on the virtual viewpoint information;

performing learning of the learning model based on the learning condition, the image capturing parameters, and data of the captured image;

obtaining a virtual viewpoint image corresponding to an appearance from the virtual viewpoint based on the virtual viewpoint information; and determining a degree of importance of the object in a case where the learning of the learning model is performed based on an object area, which is an image area corresponding to the object in the obtained virtual viewpoint image, wherein the determining of the learning condition is performed based on the determined degree of importance of the object.

* * * * *